United States Patent
Hiregoudar et al.

(10) Patent No.: US 12,050,938 B2
(45) Date of Patent: Jul. 30, 2024

(54) BALANCE WORKLOADS ON NODES BASED ON ESTIMATED OPTIMAL PERFORMANCE CAPACITY

(71) Applicant: NetApp, Inc., Sunnyvale, CA (US)

(72) Inventors: Abhishek Hiregoudar, Arlington, MA (US); Siu Wu, Canton, MA (US); Alma Dimnaku, Wellesley, MA (US)

(73) Assignee: NETAPP, INC., San Jose, CA (US)

( * ) Notice: Subject to any disclaimer, the term of this patent is extended or adjusted under 35 U.S.C. 154(b) by 385 days.

(21) Appl. No.: 17/107,361

(22) Filed: Nov. 30, 2020

(65) Prior Publication Data

US 2022/0171663 A1 Jun. 2, 2022

(51) Int. Cl.
*G06F 9/50* (2006.01)
*G06F 3/06* (2006.01)

(52) U.S. Cl.
CPC ............ *G06F 9/5083* (2013.01); *G06F 3/061* (2013.01); *G06F 3/0631* (2013.01);
(Continued)

(58) Field of Classification Search
CPC ...... G06F 9/5083; G06F 3/061; G06F 3/0631; G06F 3/0646; G06F 3/0683;
(Continued)

(56) References Cited

U.S. PATENT DOCUMENTS 10,469,582 B2 * 11/2019 Dimnaku ............ H04L 67/1097
11,216,317 B1 * 1/2022 Shibayama ........... G06F 3/0673
(Continued)

FOREIGN PATENT DOCUMENTS

CN 111966496 A * 11/2020 ........... G06F 9/5066
JP 2000155695 A * 6/2000

OTHER PUBLICATIONS

CN111966496A Description Translation, Nov. 20, 2020, [database online], [retrieved on Nov. 30, 2022] Retrieved from Espacenet using Internet <URL:https://worldwide.espacenet.com/publicationDetails/description?CC=CN&NR=111966496A&KC=A&FT=D&ND=3& date=20201120&DB=&locale=en_EP>, pp. 1-23 (Year: 2020).*

(Continued)

*Primary Examiner* — Meng Ai T An
*Assistant Examiner* — Hsing Chun Lin
(74) *Attorney, Agent, or Firm* — HAYNES AND BOONE, LLP

(57) ABSTRACT

Systems, methods, and machine-readable media for monitoring a storage system and correcting demand imbalances among nodes in a cluster are disclosed. A performance manager for the storage system may detect performance imbalances that occur over a period of time. When operating below an optimal performance capacity, the manager may cause a volume to be moved from a node with a high load to a node with a lower load to achieve a preventive result. When operating at or near optimal performance capacity, the manager may cause a QOS limit to be imposed to prevent the workload from exceeding the performance capacity, to achieve a proactive result. When operating abnormally, the manager may cause a QOS limit to be imposed to throttle the workload to bring the node back within the optimal performance capacity of the node, to achieve a reactive result. These actions may be performed independently, or in cooperation.

19 Claims, 9 Drawing Sheets

(52) U.S. Cl.
CPC .......... *G06F 3/0646* (2013.01); *G06F 3/0683* (2013.01); *G06F 9/5011* (2013.01); *G06F 9/5077* (2013.01); *G06F 2209/5022* (2013.01); *G06F 2209/505* (2013.01)

(58) Field of Classification Search
CPC .................. G06F 9/5011; G06F 9/5077; G06F 2209/5022; G06F 2209/505; G06F 3/0647
See application file for complete search history.

(56) References Cited

U.S. PATENT DOCUMENTS

| | | | | |
|---|---|---|---|---|
| 2010/0238802 | A1* | 9/2010 | Lei | H04L 41/5019 370/230.1 |
| 2010/0293412 | A1* | 11/2010 | Sakaguchi | G06F 11/0715 711/E12.001 |
| 2015/0186070 | A1* | 7/2015 | Miller | G06F 11/2069 711/162 |
| 2015/0324239 | A1* | 11/2015 | Venkumahanti | G06F 9/5088 718/104 |
| 2019/0132222 | A1* | 5/2019 | Son | H04L 67/562 |
| 2021/0105322 | A1* | 4/2021 | Sakashita | H04L 41/0896 |

OTHER PUBLICATIONS

Sugawara, JP2000155695A Description Translation, Jun. 6, 2000, [retrieved on Jul. 28, 2023] Retrieved from Espacenet using Internet <URL:https://worldwide.espacenet.com/publicationDetails/description?CC=JP&NR=2000155695A&KC=A&FT=D&ND=3&date=20000606&DB=&locale=en_EP>, pgs. (Year: 2000).*

* cited by examiner

BALANCE WORKLOADS ON NODES BASED ON ESTIMATED OPTIMAL PERFORMANCE CAPACITY

TECHNICAL FIELD

The present description relates to managing performance of data storage. More specifically, the present description relates to managing the load associated with data storage over the lifecycle of the data storage, such as in a data cluster on premises or in the cloud.

BACKGROUND

A storage system typically includes at least a computing system executing a storage operating system for storing and retrieving data on behalf of one or more client computing systems. To process an input/output (I/O) request to read and/or write data, various resources are typically used within a storage system. As storage systems continue to expand in size, complexity and operating speeds, it is desirable to efficiently monitor and manage resource usage.

Continuous efforts are being made to better manage and monitor resources of networked storage environments. For example, if the demand in one or more resources of a storage system is detected to be at its optimal performance capacity level for the resources, then there is a risk that some added load (even a small one) would degrade the performance of all other workloads managed by the storage system (such as by a node of the storage system). More generally, it is desirable to have the resources of the storage system, such as nodes in a cluster, loaded more uniformly. Otherwise, unnecessary hotspots caused by an imbalance may arise. This is increasingly an issue with the size of storage system deployments increasing in size.

Moreover, with the increasing size of deployments, the complexity of monitoring and balancing the resources of the cluster is becoming prohibitively difficult. As a result, there is a need to manage performance of workloads as they trend toward a level beyond the optimal performance capacity level, in order to achieve more consistent performance across nodes of the storage system.

BRIEF DESCRIPTION OF THE DRAWINGS

The present disclosure is best understood from the following detailed description when read with the accompanying figures.

DETAILED DESCRIPTION

Figure 1:
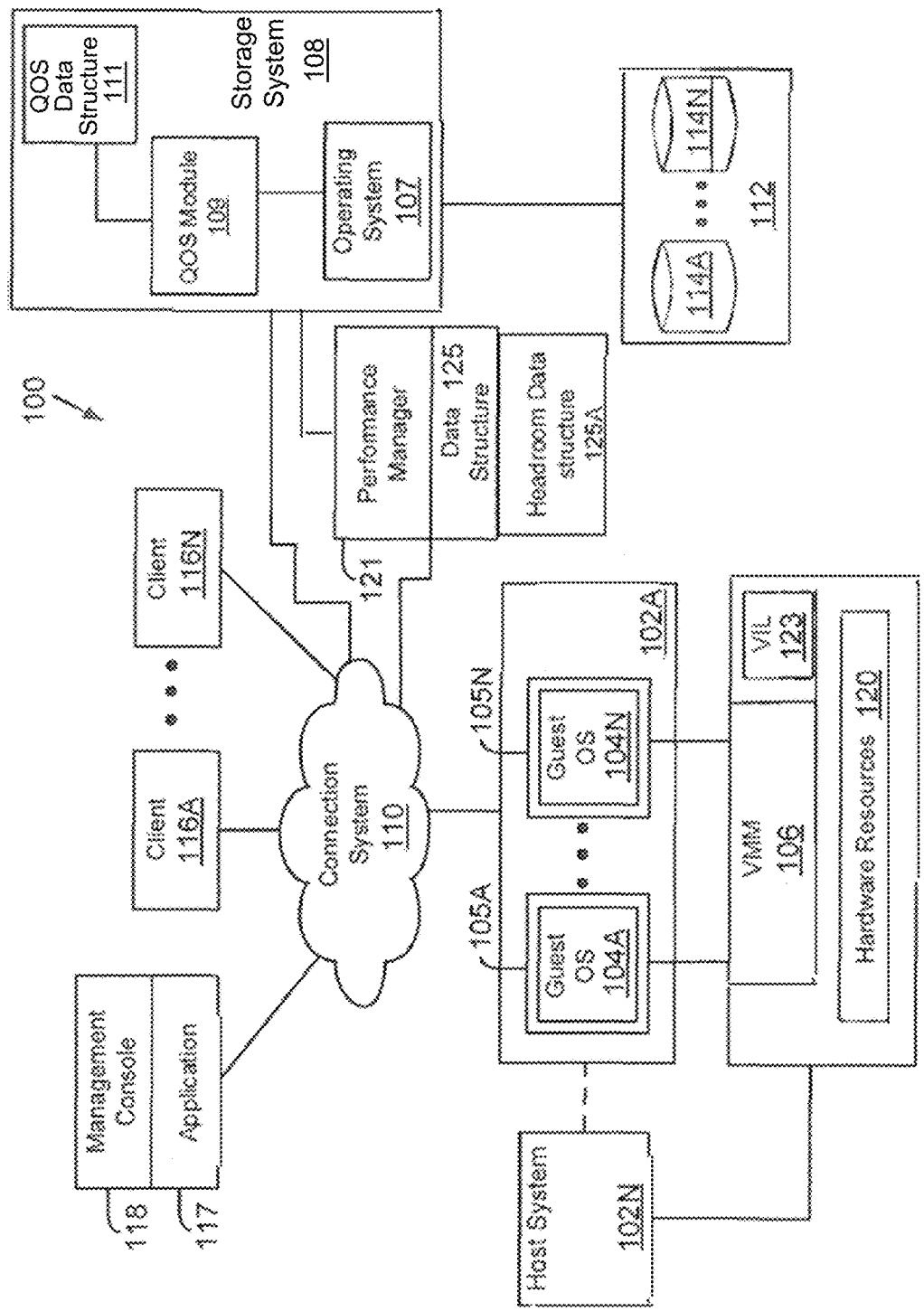
FIG. 1 illustrates an example of an operating environment used by some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for monitoring and managing resource workloads associated with data storage over the lifecycle of the data storage, such as in a data cluster on premises or in the cloud. In an embodiment, a storage system may contain one or more resources, or nodes. Each node may include one or more storage volumes provisioned through a user interface. Each resource, or node, in the storage system may have an optimal performance capacity. As used herein, optimal performance capacity may refer to a point between latency and utilization for the resource, node, etc., representing a maximum utilization of a resource. Beyond that point, an increase in workload (or load, more generally at a node) may exhibit a rapid increase in latency. Accordingly, beyond the optimal performance capacity, if workload increases at the resource, a throughput gain or utilization increase may be smaller than the increase in latency. User demand, or workload, on each node may increase and decrease leading to deviation from optimal performance.

The nodes may have three states, where demand is 1) lower than the optimal performance capacity, 2) at the optimal performance capacity, or 3) higher than the optimal performance capacity. The workloads on each node may grow, or increase, over time requiring rebalancing of the workloads across the nodes in the storage system. The storage system may be rebalanced by moving volumes between nodes or corrected by setting quality of service (QOS) limits on one or more nodes. A QOS limit may limit the workload on a node. Different rates of growth in different workloads, and nodes, may cause workloads within the nodes, or nodes within the storage cluster, to become imbalanced and create unnecessary hot spots. Properly managing the workloads on each node ensures consistent performance across nodes that performs well for all users.

According to embodiments of the present disclosure, a performance manager (e.g. a software or hardware component within the storage system or associated with the storage system) may be used in innovative ways to automate the monitoring and management of the various resources within a cluster based storage system across the lifetime of the storage system.

For example, a performance manager may monitor the workloads and/or loads of the various nodes and volumes within the nodes and preemptively move volumes from one node to another to rebalance the workloads across the nodes. Monitoring of the workloads may include monitoring and measuring the workload of the storage system over time, learning about the nature of the workload served by the storage system, and corresponding performance results. Monitoring of the nodes may include monitoring and measuring the load on the node, analyzing the impact of the workloads (or volumes) on the node, and corresponding performance results. The performance manager may interface with a storage operating system to collect performance data for various resources. Performance data provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests.

Performance imbalances may arise at any time and may be handled differently depending on whether the affected node is operating at its optimal performance capacity. As an example of resource management, when resources are working below their optimal performance capacity a volume may be moved from one resource to another with little to no impact on the performance of the resources. The performance manager may monitor the resources in order to detect such imbalances. The performance manager may determine that there is an imbalance if it detects a difference in load of a threshold amount (such as about 30%) over a period of time (e.g., 24 hours). In this situation, the performance manager may analyze the workloads of the volumes on the node with a higher load and select one or more volumes to move to a node having a lower load. This approach may rebalance the load of the resources to avoid unnecessary hot spots and keep the resources working within their optimal performance capacity.

As another example of resource management, when a load in a certain node is increasing and/or reaching optimal capacity, the performance manager may implement QOS policies on the workloads of the resource. The performance manager may determine that a resource is over utilized if it is operating at optimal performance capacity for a period of time (e.g., 24 hours). If the performance manager determines from this that a resource is over utilized, the performance manager may take proactive actions. Proactive actions taken by the performance manager may include setting QOS limits on the node(s) to avoid overloading the resource. The goal of imposing the QOS limits may be to ensure continuous, consistent performance of the resource without risking degrading the performance of the resource. The performance manager may remove the QOS limits after determining, based on usage patterns, that the workload has been reduced sufficiently and that there is no longer a risk of degraded performance.

As another example of resource management, when a resource is operating at higher than its optimal performance capacity (e.g., due to one of the workloads growing abnormally), then the performance manager may take reactive actions. Reactive actions taken by the performance manager may include setting QOS limits on the abnormal workload (e.g. abnormally growing workload, such as a large disparity between currently measured workload to historical workload, such as currently measuring 1000 IOPS per day where historically the average has been much lower, such as one or more orders of magnitude lower as just one example) to bring the overall performance back to the optimal performance capacity. The performance manager may continue to monitor the abnormal, or rogue, workload for any changes in performance, such as a reduction in performance or a reduction in the abnormal behavior (and corresponding improvement in performance). When the abnormal behavior subsides, the performance manager may remove the QOS limits on the workload and return the workload to its previous state.

Under any of the examples mentioned above, in some embodiments the performance manager may take an iterative approach towards addressing imbalances (such as operating at or above optimal performance capacity). For example, the performance manager may first detect the imbalance, as noted above, then analyze the information related to the imbalance to determine whether any action may contribute towards resolving the imbalance. If so, the performance manager may take the determined action, such as according to one or more of the examples given above and discussed in more detail below. After the action has been taken, the performance manager may continue monitoring the resource(s) of the nodes. If an imbalance is detected again, such as might arise where the original imbalance has not been sufficiently resolved/mitigated, then the performance manager may go through a similar process again. This may be done repeatedly, and in the background, so that it does not affect actual work requested by one or more users, as well as done in a manner that maintains requested hardware configuration (such as storage device type/speed/ etc.).

As a result, embodiments of this system enable a storage system to monitor and manage resource workloads that may be too complex for manual monitoring/decision making. The performance manager may take preventive actions, proactive actions, or reactive actions based on the state of the storage system. The actions taken by the performance manager may reduce cluster imbalances in the storage system allowing for greater overall utilization of the resources. This is caused by more efficient use of the resources. Moreover, the actions taken by the performance manager may reduce disruptions to resources and workloads in the system by limiting the growth of normal and abnormal workloads. This provides, overall, a framework to enable users to ensure consistent performance throughout the lifetime of a storage system (e.g., a cluster) despite the stage in operation of the system. By maintaining the resource(s) at or below their optimal performance capacity according to embodiments of the present disclosure, the performance of all workloads served by the resource(s) may be optimized as well.

FIG. 1 illustrates a system architecture 100 where embodiments of the present disclosure may be implemented. The architecture 100 may include a performance manager 121 that interfaces with a storage operating system 107 of a storage system 108 for receiving performance data and performing actions related to workload management as described further herein. The performance manager 121 may be a processor executable module that is executed by one or more processors out of a memory device.

The performance manager 121 may obtain the performance data and store it at a data structure 125. In some embodiments, performance manager 121 may analyze the performance data for determining headroom, or available performance capacity, for a given resource. Headroom related information may be stored at data structure 125A. Details regarding the various operations performed by the performance manager 121 for determining headroom are provided below.

In some embodiments, storage system 108 may have access to a set of mass storage devices 114A-114N (which may be referred to as storage devices 114 or simply as storage device 114) within at least one storage subsystem 112. The storage devices 114 may include writable storage device media such as magnetic disks (HDD), video tape, optical, digital video disk (DVD), magnetic tape, non-volatile memory devices for example, solid state drives (SSDs) including self-encrypting drives, flash memory devices, and any other similar media adapted to store information. The storage devices 114 may be organized as one or more groups of Redundant Array of Independent (or Inexpensive) Disks (RAID) or other type of redundancy. The embodiments disclosed are not limited to any particular storage device type or storage device configuration.

In some embodiments, the storage system 108 may provide a set of logical storage volumes (which may be interchangeably referred to as volume or storage volume herein) for providing physical storage space to clients 116A-116N (or virtual machines (VMs) 105A-105N). A storage volume may be a logical storage object and may typically include a file system in a NAS environment or a logical unit number (LUN) in a SAN environment. The various embodiments described herein are not limited to any specific format in which physical storage is presented as logical storage (volume, LUNs, and others).

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at least one storage device, an aggregate of some or all of the storage space in multiple storage devices, a RAID group, or any other suitable set of storage space.

A storage volume may be identified by a unique identifier (e.g., a Volume-ID) and be allocated certain storage space during a configuration, or provisioning, process. When the storage volume is created, a QOS policy may be associated with the storage volume such that requests associated with the storage volume can be managed appropriately. The QOS policy may be a part of a QOS policy group that is used to manage QOS for several different storage volumes as a single unit. The QOS policy information may be stored at a QOS data structure 111 maintained by a QOS module 109. QOS at the storage system level may be implemented by the QOS module 109. The QOS module 109 may maintain various QOS data types that are monitored and analyzed by the performance manager 121, as described below in detail.

The storage operating system 107 may organize physical storage space at storage devices 114 as one or more "aggregates," where each aggregate may be a logical grouping of physical storage identified by a unique identifier and a location. An aggregate may include a certain amount of storage space that can be expanded. Within each aggregate, one or more storage volumes may be created whose size can be varied. A qtree, sub-volume unit may also be created within the storage volumes. For QOS management, each aggregate and the storage devices within the aggregates may be considered as resources that are used by storage volumes.

The storage system 108 may be used to store and manage information at storage devices 114 based on an I/O request. The request may be based on file-based access protocols, such as the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP). As yet other examples, the request may use one or more other cloud-related protocols.

In a typical mode of operation, a client (or a VM) may transmit one or more I/O requests, such as a CFS or NFS read or write request, over a connection system 110 (e.g., a network 110) to the storage system 108. The storage operating system 107 may receive the request, issue one or more I/O commands to storage devices 114 to read or write the data on behalf of the client system, and issue a CIFS or NFS response containing the requested data over the network 110 to the respective client system. The network 110 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 110 may use TCP/IP, a remote direct memory access (RDMA) protocol (e.g., Infiniband®, RDMA over Converged Ethernet (RoCE) protocol (e.g., RoCEv1, RoCEv2), iWARP), and/or another type of protocol. Network 110 may be local or remote with respect to a rack or datacenter.

Additionally, or in the alternative, the network 110 may extend between sites in a WAN configuration or be a virtual network extending throughout a cloud. Thus, storage nodes of the storage system 108 may be as physically close or widely dispersed as needed depending on the application of use. In some examples, the storage nodes are housed in the same racks. In other examples, the storage nodes are located in different facilities at different sites around the world. The distribution and arrangement of the storage nodes may be determined based on cost, fault tolerance, network infrastructure, geography of the server nodes, another consideration, or a combination thereof.

The architecture 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources." More generally, the architecture 100 may provide infrastructure including any set of resources used for executing one or more containers, virtual machines, or other hosted virtualization tool.

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources." The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage), communication capacity resources, etc., that reside in a physical machine or are coupled to the host system. These may be resources that a virtualization tool may use for execution of one or more workloads for clients, including any combination of on-premises, distributed, and/or cloud resources.

In some embodiments, the architecture 100 may also include a plurality of computing systems 102A-102N (which may also be referred to individually as host platform/system 102 or simply as server 102) communicably coupled to the storage system 108 via the connection system 110. As described herein, the term "communicably coupled" may refer to a direct connection, a network connection, a wireless connection, or other connections to enable communication between devices.

The host system 102A may include a processor executable virtual machine environment having a plurality of VMs 105A-105N that may be presented to client computing devices/systems 116A-116N. The VMs 105A-105N may execute a plurality of guest OS 104A-104N (which may also be referred to as guest OS 104) that share hardware resources 120. As described above, hardware resources 120 may include processors, memory, I/O devices, storage or any other hardware resource. Moreover, as also noted above, the VMs 105A-105N may instead be containers or other hosted virtualization tool.

In some embodiments, the host system 102 may interface with a virtual machine monitor (VMM) 106, for example, a processor executed Hyper-V layer provided by Microsoft Corporation of Redmond, Wash., a hypervisor layer provided by VMWare Inc., or any other type. The VMM 106 may present and manage the plurality of guest OS 104A-104N executed by the host system 102. The VMM 106 may include or interface with a virtualization layer (VIL) 123 that provides one or more virtualized hardware resource to each OS 104A-104N. As another example, the host system 102 may interface with one or more monitors associated with container resources, such as part of an orchestration platform, or other monitoring tool associated with a hosted virtualization tool. Aspects will be discussed herein with reference to VMM 106 for simplicity of discussion.

In some embodiments, the VMM 106 may be executed by the host system 102A with VMs 105A-105N. In other embodiments, the VMM 106 may be executed by an independent stand-alone computing system, often referred to as a hypervisor server or VMM server and the VMs 105A-105N are presented at one or more computing systems.

Different vendors may provide different virtualization environments, for example, VMware Corporation, Microsoft Corporation and others. The generic virtualization environment described above with respect to FIG. 1 may be customized to implement the aspects of the present disclosure. Furthermore, the VMM 106 (or the VIL 123) may execute other modules, for example, a storage driver, network interface and others, the details of which are not germane to the aspects described herein and hence have not been described in detail.

The architecture 100 may also include a management console 118 that may execute a processor executable management application 117 for managing and configuring various elements of the architecture 100. The application 117 may be used to manage and configure VMs and clients as well as configure resources that are used by VMs/clients, according to some embodiments. While one management console 118 is shown in FIG. 1, the architecture 100 may include other management consoles performing certain functions, for example, managing storage systems, managing network connections and other functions described below.

In some embodiments, the application 117 may be used to present storage space that is managed by the storage system 108 to clients 116A-116N (or VMs, containers, etc.). The clients may be grouped into different service levels (also referred to as service level objectives or "SLOs"), where a client with a higher service level may be provided with more storage space than a client with a lower service level. A client at a higher level may also be provided with a certain QOS vis-à-vis a client at a lower level.

Figure 2:
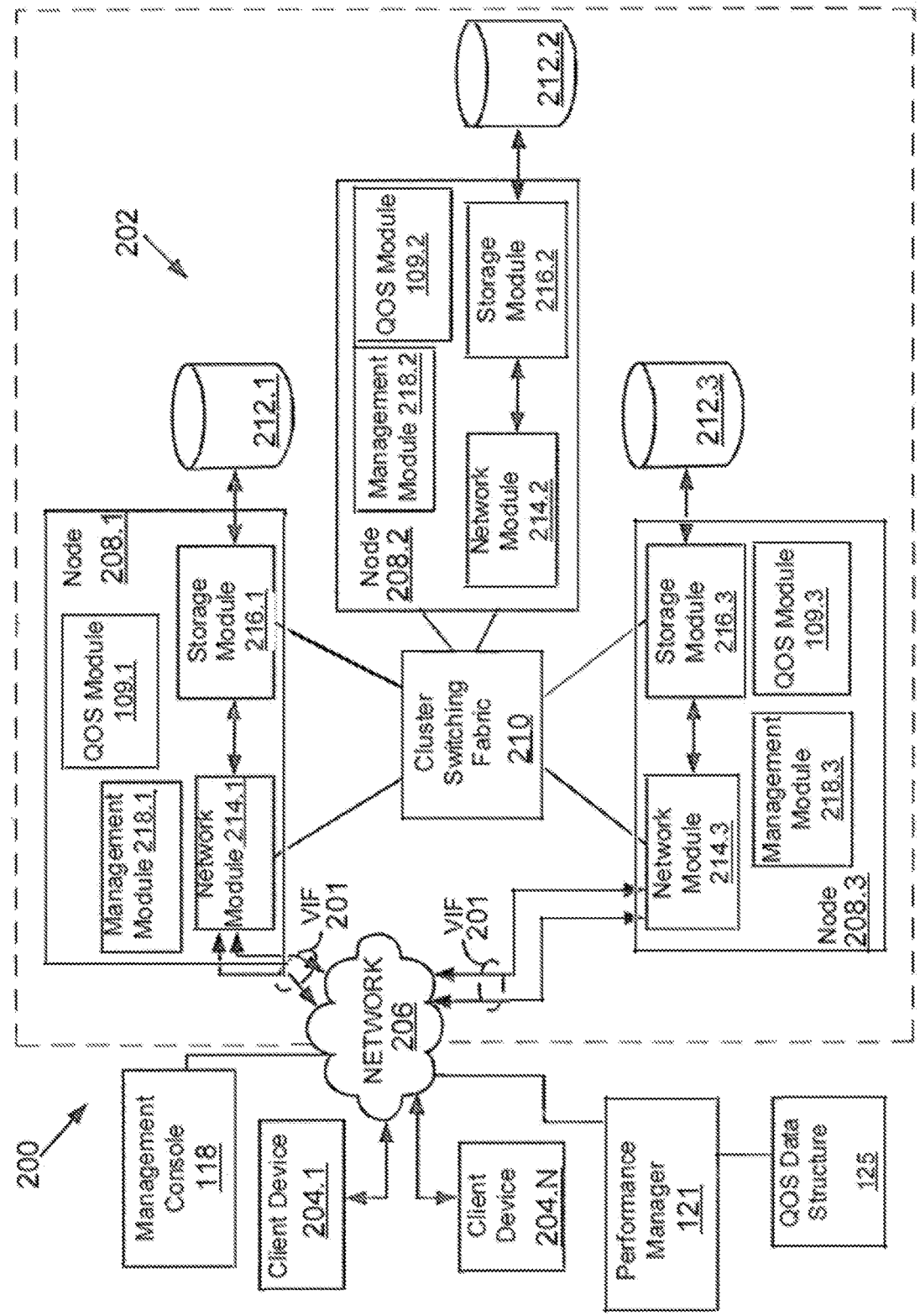
FIG. 2 illustrates an example of a clustered storage system, used according to some embodiments of the present disclosure.

The storage system 108 may be a stand-alone system, i.e. a non-cluster based system, while in other embodiments, the storage system 108 may have a distributed architecture (and/or cloud-based architecture). For example, FIG. 2 illustrates a cluster-based system.

According to some embodiments, the storage environment 200 has a plurality of nodes for managing storage devices. The storage environment 200 may include a plurality of client systems 204.1-204.N (similar to clients 116A-116N, FIG. 1), a clustered storage system 202, performance manager 121, management console 118, and at least a network 206 (examples of which were given above with respect to network 110 of FIG. 1) communicably connecting the client systems 204.1-204.N and the clustered storage system 202.

The clustered storage system 202 may include a plurality of nodes 208.1-208.3, a cluster switching fabric 210, and a plurality of mass storage devices 212.1-212.3 (which may be referred to as storage device 212 and similar to storage device 114) used as resources for processing I/O requests.

Each of the plurality of nodes 208.1-208.3 may be configured to include a network module (which may be referred to as N-module), a storage module (which may be referred to as D-module), and a management module (which may be referred to as M-Module), each of which can be implemented as a processor executable module. Specifically, node 208.1 may include a network module 214.1, a storage module 216.1, and a management module 218.1; node 208.2 may include a network module 214.2, a storage module 216.2, and a management module 218.2; and node 208.3 may include a network module 214.3, a storage module 216.3, and a management module 218.3.

The network modules 214.1-214.3 may include functionality that enable the respective nodes 208.1-208.3 to connect to one or more of the client systems 204.1-204.N over the network 206, while the storage modules 216.1-216.3 may connect to one or more of the storage devices 212.1-212.3. Accordingly, each of the plurality of nodes 208.1-208.3 in the clustered storage server arrangement may provide the functionality of a storage server. The management modules 218.1-218.3 may provide management functions for the clustered storage system 202. For example, the management modules 218.1-218.3 may collect storage information regarding storage devices 212.

Each node may execute or interface with a QOS module, shown as 109.1-109.3 in FIG. 2, similar to the QOS module 109. The QOS module 109 may be executed for each node or a single QOS module may be used for a subset of, or all of, the cluster. The aspects disclosed herein are not limited to the number of instances of QOS module 109 that may be used in a cluster. In addition, a switched virtualization layer including a plurality of virtual interfaces (VIFs) 201 may be provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM may have a client domain and a security domain that are separate from the client and security domains of other SVMs. Moreover, each SVM may be associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 may be defined as a computing system to provide application services to one or more of the client systems 204.1-204.N. The nodes 208.1-208.3 may be interconnected by the switching fabric 210, which, for example, may be embodied as a Gigabit Ethernet switch or any other type of switching/connecting device including one or more of the examples given above with respect to network 110 in FIG. 1.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206.

According to embodiments of the present disclosure, the performance manager 121 may monitor the workloads of the various nodes 208.1-208.3 and volumes within the nodes (e.g., of volumes maintained on one or more of the storage modules 216.1-216.3 as volumes, aggregates, etc.). The performance manager 121 may analyze data from the various nodes 208.1-208.3 in order to determine headroom, or available performance capacity, for a given resource. This may be collected and analyzed over time by the performance manager 121. Headroom may also be referred to herein as measured used performance capacity. Headroom may be based on a relationship of an optimal point subtracted by an operational, with the result of that divided by the optimal point. Stated another way, headroom may be based on a current utilization and a current optimal point that is determined based on collected and/or observed data. The headroom may be updated based on new current utilization information of the resource of interest. Further, the headroom may be use a peak value or an average value as input.

This headroom may be compared against an estimated optimal performance capacity for the overall system, or specific nodes in particular, to assess an amount of demand across the resource(s) of the clustered storage system 202. If the performance manager 121 determines, from this assessment, that there is an imbalance in distribution of the workload across the nodes, over a period of time, then this may mark an imbalance event in the system.

In situations where the user demand is lower than the estimated optimal performance capacity, but the threshold has been passed such that an imbalance event is triggered, the performance manager 121 may engage in a preventive action to maintain the health of the cluster and, specifically, better balance the workload across the nodes 208.1-208.3 (as just an illustrative example). This may include preemptively moving one or more volumes from a node where the imbalance is detected (e.g., workload on one or more resources of the node is approaching the estimated optimal performance capacity) to another node that is well under its estimated optimal performance capacity. As an example, the threshold at which such action may be triggered may be a percentage difference, such as around 30% (as just one example among many, which may be externally set by an administrator, dynamically adjusted by a user or automatically by the system in response to one or more events such as addition of nodes, removal or failure of nodes, addition or removal of storage capacity, processing capacity, throughput, etc.). This may be a difference that is measured over time, such as a period on the order of a day in order to maintain control over the amount of resources that the act of rebalancing itself consumes.

The volume move may be determined and/or initiated when demand of resources in the clustered storage system 202 is below the estimated optimal performance capacity so that a volume move does not add demand that would affect user/client workload performance. This approach may rebalance the workloads of the resources to avoid unnecessary hot spots and keep the resources working within their optimal performance capacity. In particular, the performance manager 121 may take into account, when determining a volume move as a preventive action, any configurations that could be violated with a volume move (to avoid such violation, such as part of an aggregate, a root volume, or a volume tiered in the cloud, etc.). Further, the performance manager 121 may, in its determination, focus on volume moves that would reduce the overall cluster demand imbalance rather than shift the condition from one node to another.

In other situations, user demand may be at the estimated optimal performance capacity of the clustered storage system 202 (e.g., determined by comparing the headroom to the estimated optimal performance capacity, such as over a window of time on the order of a day). The performance manager 121 may, in this situation, not move a volume from one node to another as it could affect user/client workload performance. In this example, the performance manager 121 may engage in a proactive action to maintain the health of the cluster and maintain some balance between the nodes' workloads.

When user demand is at optimal performance capacity, the performance manager 121 may implement QOS policies on the workloads of the resource at one or more nodes 208.1-208.3 instead of moving a volume to address the imbalance. As noted above, the goal of imposing the QOS limits may be to ensure continuous, consistent performance of the resource without risking degrading the performance of the resource. The performance manager 121 may introduce QOS limits on one or more workload(s) at one or more nodes, such as up to five workloads (as one example, e.g. the five workloads with the highest growth with a goal of limiting the growth of the workloads). The QOS limit(s) (whether expected values, peak values, or some combination of both) may be estimated through a historical analysis (e.g., by the performance manager 121) of TOPS requested by the selected workload(s) (i.e., the workload(s) selected as a candidate for having a QOS policy (or multiple) imposed).

The introduction of the QOS limit(s) may be new to the selected workload(s)—that is, the selected workload(s) does not yet have any QOS limit(s) imposed, or not yet the type of QOS limit being imposed. Alternatively, the QoS limit(s) being introduced may be a newly proposed QOS limit value for a QOS limit that is already in place for the selected workload(s). For example, an existing QOS limit may be higher than the one(s) estimated by the performance manager 121 as suggested to be set. As a result, the node(s) with the QOS limits imposed would manage its workload under the constraints of the QOS limit(s). By introducing the QOS limit(s) at the optimal performance capacity (e.g., the headroom determined by the performance manager 121 being the same as or within a threshold amount of the estimated optimal performance capacity), the performance manager 121 may aid the clustered storage system 202's nodes 208.1-208.3 to maintain operation at or around the current level to ensure continuous, consistent performance that avoids the risk of potential degradation if additional growth of demand is allowed in the node resource at issue. Further, the performance manager 121 may remove the QOS limit(s) later, e.g. after determining, based on usage patterns (over time, such as on the order of hours or days), that the workload has been reduced sufficiently and that there is no longer a risk of degraded performance.

In other situations, user demand may be above the estimated optimal performance capacity of the clustered storage system 202 (e.g., determined by comparing the headroom to the estimated optimal performance capacity, such as over a window of time, such as about 30 minutes). The performance manager 121 may, in this situation, engage in a reactive action to maintain the health of the cluster and maintain some balance between the nodes' workloads. This may correspond to a situation where a node 208's workload growing abnormally. An example of a reactive action taken by the performance manager 121 may include setting QOS limits on the growing workload to bring the overall performance back to the optimal performance capacity. The node(s) 208 with the abnormal performance degradation (e.g. growing workload) may begin throttling the abnormal workload according to the QOS limit(s). In some examples, the throttling may be of one workload, while in other examples the throttling may be of any number of workloads exhibiting abnormal performance degradation. The performance manager 121 may continue to monitor the abnormal workload for any changes in performance, such as due to a change in user usage patterns or a reduction in the abnormal behavior. When the change in performance is detected (i.e., reducing to at or below the optimal performance capacity), the performance manager 121 may remove the QOS limit(s) or modify the QOS limit(s) to some previous level.

In general, the above actions may be taken over time at different stages of workload. Thus, at some points in time the clustered storage system 202 may be in a state where user demand is less than the estimated optimal performance capacity, and one or more preventive actions (e.g., volume moves) may be taken, such as via an iterative approach. At other points in time, the clustered storage system 202 may be in a state where user demand is equal to or near the estimated optimal performance capacity, and one or more proactive actions (e.g., setting QOS limit(s)) may be taken by the performance manager 121. At yet other points I time, the clustered storage system 202 may be in a state where user demand exceeds the estimated optimal performance capacity, and one or more reactive actions (e.g., throttling pursuant to one or more QOS limit(s)) may be taken by the performance manager 121. In the various points of time, the performance manager 121 may utilize headroom (e.g., the measured used performance capacity) in its comparisons to the estimated optimal performance capacity. Thus, the performance manager 121 may engage in workload lifecycle management for data storage systems via preventive, proactive, and/or reactive actions, depending on a given state of the system. While described together herein, each state may be implemented independently of the others.

Figure 3:
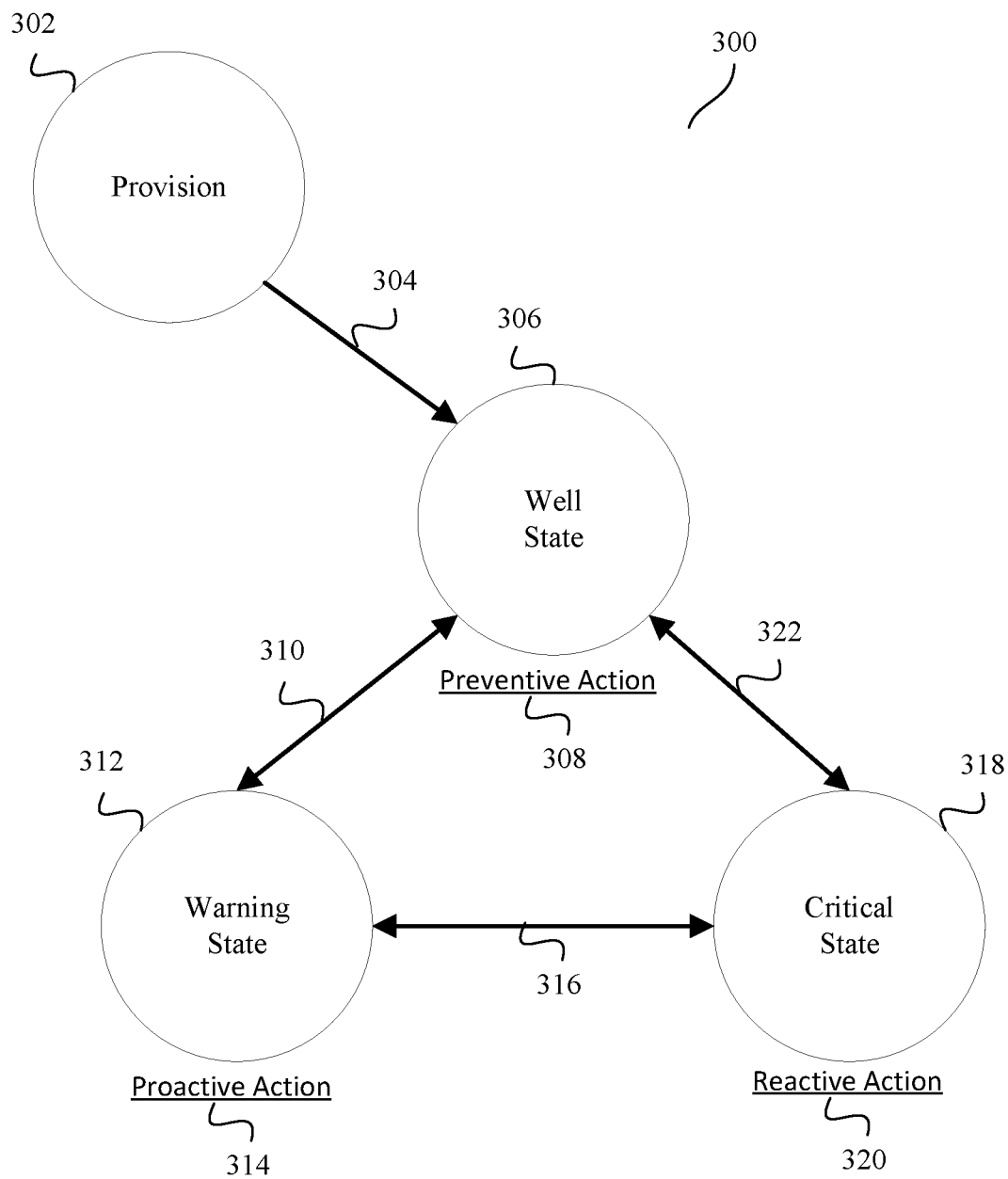
FIG. 3 illustrates an exemplary state diagram for some embodiments of the present disclosure.

These different states are illustrated in FIG. 3, while provides a storage system state diagram 300. The state diagram 300 shows, in particular, the different states that a storage system (e.g. architecture 100 or storage system 200) may be in at a given point in time, how the states that the storage system may transition between, and actions that may be performed in each state. Again, as noted previously while relationships are illustrated as transitions between states, embodiments of the present disclosure may implement any given state independently of the others. Discussion of the states in FIG. 3 will be made with respect to an exemplary storage volume for simplicity. The discussion applies to any number of volumes and/or nodes within a storage system according to embodiments of the present disclosure.

At state 302, a storage volume of a resource (e.g., a node or some component of a node) may be in the provisioning state as it is being provisioned for use by a user. In some embodiments, the storage volumes may be on a node in the storage system and/or be part of an aggregate. In some embodiments, more resources are added when existing resources run out of headroom and more workloads are requested. For example, nodes may be added as high availability pairs. In other embodiments, resources may be added as node-aggregate pairs. In some embodiments, the system may suggest which type of resource is best suited for the requested workload.

The storage system may transition from the provisioning state 302 to another state. This is illustrated with transition 304 in FIG. 3. At transition 304, the storage volume may transition from the provisioning state 302 to the well state 306. This may occur, for example, when provisioning of the volume is completed.

At state 306, the storage volume, along with the accompanying resource, or node, is in the well state. While in the state 306, for example, the resource (referring to one for simplicity of discussion) may be operating below the optimal performance capacity. In some embodiments, operating below the optimal performance capacity may refer to operating between about 0% and about 80% of the estimated optimal performance capacity of the node. This may be determined by the performance manager 121 (FIG. 1 or 2) monitoring performance data of the system over time and determining, such as around every 24 hours, measured used performance capacity (such as in the form of a headroom value).

The performance manager 121 may monitor the load of all of the nodes in the storage system and determine whether the performance of the nodes is balanced. In a balanced storage system, the load of each node in the system may be similar to the load of the other nodes. A system imbalance may occur when the measured load of one node (e.g., as reflected in a determined headroom value) varies from the load of another node by a predefined percentage over a period of time. In some embodiments, a storage system imbalance may be defined as one node having a workload of approximately 30% more than another node over a period of time (such as 24 hours).

When an imbalance is determined (while the overall performance data indicates that the headroom is still below the estimated optimal performance capacity of the storage system, the performance manager 121 may keep the system in the well state 306 and take preventive action 308 to address (and, potentially, cure) the imbalance. For preventive action 308, the performance manager 121 may initiate a volume move to another node with less load. The performance manager 121 may do so in order to better balance the load across the nodes of the system. This may include preemptively moving one or more volumes from a node where the imbalance is detected (e.g., the node is approaching the estimated optimal performance capacity) to another node that is below its optimal performance capacity.

The performance manager 121 may maintain the system in the well state 306, while triggering the preventive action 308, while the performance manager 121 iteratively works on transitioning one or more volumes to other, less burdened nodes, until a relative equilibrium is achieved, such as within a window of time. Such equilibrium may be measured by the headroom of each node compared to the estimated optimal performance capacity of the node, or by comparing the headroom of the overall system to an overall estimated optimal performance capacity of the system. The system may transition from well state 306, however, in response to a trigger occurring.

Such transition is illustrated as transition 310 in FIG. 3. At transition 310, the performance manager 121 may transition the system, or at least a given node of the system, from the well state 306 to a warning state 312. In some embodiments, the transition 310 to the warning state 312 may be caused by a node operating at optimal performance capacity. In some embodiments, operating at optimal performance capacity is defined as the node operating between about 80% to about 100% of the performance capacity of the node.

While illustrated as the system being transitioned, e.g. by the performance manager 121, from the well state 306 to the warning state 312, in embodiments the performance manager 121 may also or alternatively transition 310 the system from the warning state 312 to the well state 306. This may correspond to conditions where the node (or system more generally) is operating below optimal performance capacity, e.g. 80% or less as just one example.

The warning state 312 may correspond to a situation where the node may be operating at the estimated optimal performance capacity. This may be determined, for example, by the performance manager 121's monitoring of the storage system and headroom determination(s) over time. Further, the performance manager 121 may continue monitoring the storage system while in the warning state 312, and continue to compare determined headroom value(s) to the estimated optimal performance capacity of the node and/or overall cluster. Proactive action 314 may be triggered, for example, when the performance manager 121 determines the headroom from data collected over a prior period of time (such as the last day).

The performance manager 121 may take proactive action 314 to maintain the node operating at optimal performance capacity. For example, the proactive action 314 may include implementing QOS policies on the workload(s) of the resource at one or more nodes (e.g., those nodes that are operating at capacity over a period of time). The performance manager 121 may determine that the workload is at the estimated optimal performance capacity for a duration of time within the monitoring period (e.g., several hours in total over a 24 hour period as one example), or for a percentage amount of time across the monitoring period (e.g., 80% of the period the headroom is at or near the optimal performance capacity). In some examples, multiple QOS policies may be implemented for a given workload at capacity, such as up to five, or more than five. As noted already, the QOS limit(s) introduced at proactive action 314 may be a new QOS limit, or a change to an existing QOS limit as some examples.

The system may further transition from warning state 312 in response to a trigger occurring. As already noted, one trigger may be a reduction of the measured performance (e.g., as reflected by a headroom value) to trigger a transition 310 back to well state 306. As another example, a trigger may be the headroom being above the estimated optimal performance capacity, such as for a duration of time within the monitoring period or for a percentage amount of time of the monitoring period.

In response to such trigger while in warning state 312, the performance manager 121 may transition 316 the storage system from the warning state 312 to a critical state 318. While illustrated as the system being transitioned, e.g. by the performance manager 121, from the warning state 312 to the critical state 318, in embodiments the performance manager 121 may also or alternatively transition 316 the system from the critical state 318 to the warning state 312, or to the well state 322 via transition 322. This may correspond to conditions where the node (or system more generally) is operating approximately at performance capacity (to transition 316 to warning state 312) or below optimal performance capacity (to transition 322 to well state 306).

At critical state 318, the workload may be operating at higher than optimal performance capacity (either over a duration of time within the monitoring window, or more than a set number of peaks above the optimal performance capacity, or some combination thereof for example). This may be determined, for example, by the performance manager 121's monitoring of the storage system and headroom determination(s) over time as noted with respect to the other states. Further, the performance manager 121 may continue monitoring the storage system while in the critical state 318, and continue to compare determined headroom value(s) to the estimated optimal performance capacity of the node and/or overall cluster. Reactive action 320 may be triggered, for example, when the performance manager 121 determines the headroom from data collected over a prior period of time (such as the last day). This may correspond to a situation where a node's workload is growing abnormally.

The performance manager 121 may engage in reactive action 320 to control the abnormal workload. An example of reactive action 320 taken by the performance manager 121 may include setting QOS limits on the growing workload to bring the overall performance back to the optimal performance capacity. The node(s) with the growing workload may begin throttling the abnormally growing workload according to the QOS limit(s) set by reactive action 320. The performance manager 121 may continue to monitor the abnormal workload for any changes in performance, such as due to a change in user usage patterns or a reduction in the abnormal behavior. When the change in performance is detected (i.e., reducing to at or below the optimal performance capacity), the performance manager 121 may remove the QOS limit(s) or modify the QOS limit(s) to some previous level, which may include the performance manager 121 transitioning 316 back to the warning state 312 or transitioning 322 to the well state 306, depending on whether the workload(s) is again at the estimated optimal performance capacity or below the estimated optimal performance capacity (that is, the determined headroom is at or below the capacity when determined from historical data over the rolling monitoring window).

Figure 4:
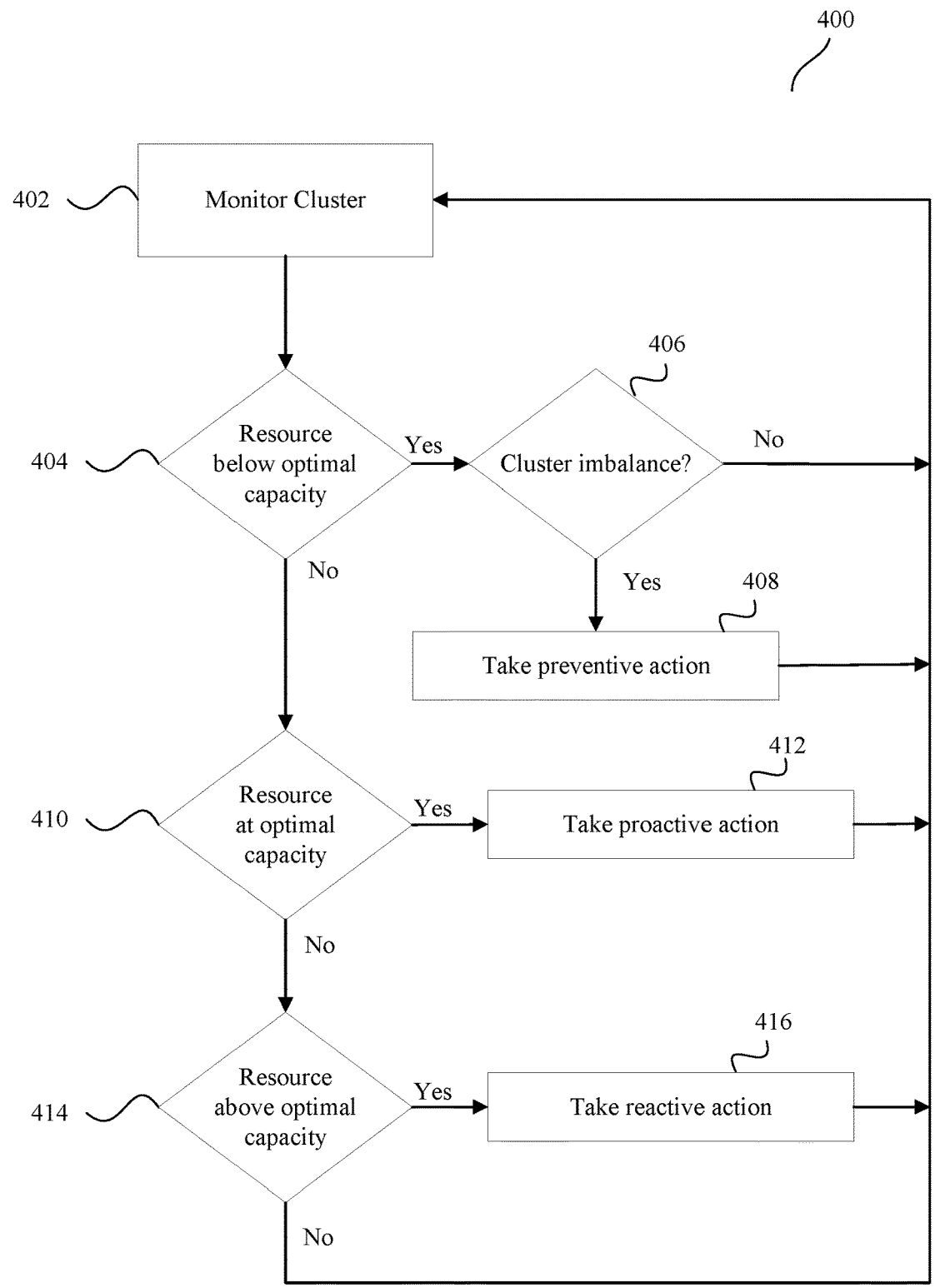
FIG. 4 illustrates a flow diagram of an exemplary method of managing resource workloads according to embodiments of the present disclosure.

Turning to FIG. 4, a flow diagram of an exemplary method 400 is illustrated according to embodiments of the present disclosure. In particular, the method 400 provides for monitoring and managing the resources of a storage system such as architecture 100 or storage system 200. The work in the method 400 may be performed by a management module that analyzes resources, or nodes, in a storage system to determine whether the resource is operating at optimal performance capacity. In some embodiments, the performance manager 121 may perform the management tasks.

Although any suitable module may perform the analysis task, the performance manager 121 will be referred to below for simplicity.

At block 402, the performance manager 121 monitors the resources of the storage system. Monitoring may include, for example, measuring the workload of the storage system (such as storage system cluster 202 of FIG. 2). This may include, in addition to monitoring, analyzing the data monitored from the various nodes of the storage system related to workload at the various nodes. Moreover, the monitoring may be done over time, such as a monitoring period. This period may be on the order of hours, for example, such as around 24 hours. Further, it may be a rolling time period where the performance manager 121 looks back at the last 24 hours, at whatever point in time the performance manager 121 is making the analysis.

At decision block 404, the performance manager 121 determines how the storage system is operating relative to its estimated optimal performance capacity. For example, the performance manager 121 may compare a headroom value determined from the monitoring at block 402, which may correspond to a measured used performance capacity over the monitoring period. Specifically, the performance manager 121 may determine at decision block 404 whether the resource monitored at block 402 is currently operating below the estimated optimal performance capacity. In some embodiments, operating below optimal capacity may refer to operating between about 0% to about 80% of performance capacity. This may refer, for example, to the performance manager 121 determining that the storage system is in the well state 306 illustrated in FIG. 3. If the storage system is operating below optimal capacity, method 400 proceeds to decision block 406.

At decision block 406, the performance manager 121 determines whether the resource determined at block 404 to be operating below the estimated optimal performance capacity exhibits a cluster imbalance between nodes of the storage system. The performance manager 121 may determine such an imbalance exists if there is a distribution of workload on the resource of greater than some threshold value, such as a percentage difference, between nodes. For example, the performance manager 121 may determine that there is an imbalance when there is a difference in workload distribution of around 30% (as just one numeric example) over the monitoring period. If there is an imbalance that satisfies the threshold, then the method 400 proceeds to block 408.

At block 408, the performance manager 121 may take preventive action to correct the determined imbalance. This may refer, as an example, to preventive action 308 of FIG. 3. In some embodiments, the performance manager 121 may redistribute workloads from one node to another, such as by moving a volume from a resource with higher demand (e.g., a node) to another resource with lower demand, which may result in a more uniform distribution across a cluster of the storage system. Once the preventive action has been taken, the method 400 may return to block 402 and proceed as discussed above and further below. In this way, iterative improvements may be made if imbalances remain or other issues arise. Further details with respect to block 408's preventive action may be found with respect to the discussion of FIGS. 5A, 5B, and 5C below.

If, instead, at decision block 406 the performance manager 121 determines that there is not an imbalance, the method 400 may return to block 402 and proceed as discussed above and further below.

Returning to decision block 404, if the performance manager instead determines that the storage system is not operating below optimal capacity, method 400 proceeds to decision block 410.

At decision block 410, the performance manager 121 determines whether the resource monitored at block 402 is operating at the estimated optimal performance capacity. In some embodiments, operating at the estimated optimal performance capacity may refer to operating between about 80% to about 100% of the estimated optimal performance capacity. The performance manager 121 may compare the headroom value determined from the monitoring at block 402, which may correspond to a measured used performance capacity over the monitoring period. This may refer to the same comparison made with reference to the discussion of decision block 404, or an additional comparison. This may be an example of the storage system being in the warning state 312 of FIG. 3. If the storage system is operating at the estimated optimal performance capacity, method 400 proceeds to block 412.

At block 412, the performance manager 121 may take proactive action to manage the performance at the estimated optimal performance capacity. This may refer, as an example, to proactive action 314 of FIG. 3. This may be done, for example, to avoid the workload of the node being overloaded. In some embodiments, the performance manager 121 may apply a QOS limit to a workload as the proactive action. Once the proactive action has been taken, the method 400 may return to block 402 and proceed as discussed above and further below. Further details with respect to block 412's proactive action may be found with respect to the discussion of FIG. 6 below.

Returning to decision block 410, if, instead, it is determined that the storage system is not operating at optimal capacity, method 400 proceeds to decision block 414.

At decision block 414, the performance manager 121 determines whether the resource monitored at block 402 is operating above the estimated optimal performance capacity. In some embodiments, operating above the estimated optimal performance capacity is defined as operating above about 100% of the estimated optimal performance capacity. The performance manager 121 may compare the headroom value determined from the monitoring at block 402, which may correspond to a measured used performance capacity over the monitoring period. This may refer to the same comparison made with reference to the discussion of decision block 404 and/or decision block 410, or an additional comparison. This may be an example of the storage system being in the critical state 318 of FIG. 3. If the storage system is operating above optimal capacity, method 400 proceeds to block 416.

At block 416, the performance manager 121 may take reactive action to manage the performance to throttle the workload back to the estimated optimal performance capacity. This may refer, as an example, to reactive action 320 of FIG. 3. This may be done, for example, to avoid the workload of the node from behaving abnormally, since an overloaded node may lead to degradation of overall performance of the storage system (such as in IOPS, latency, etc.). In some embodiments, the performance manager 121 may apply a QOS limit to a workload as the reactive action. Once the reactive action has been taken, the method 400 may return to block 402 and proceed as discussed above and further below. Further details with respect to block 414's proactive action may be found with respect to the discussion of FIG. 7 below.

Returning to decision block 414, if, instead, it is determined that the storage system is not operating at optimal capacity, method 400 returns to block 402 to continue monitoring the storage system and proceeding as discussed above.

Figure 5A:
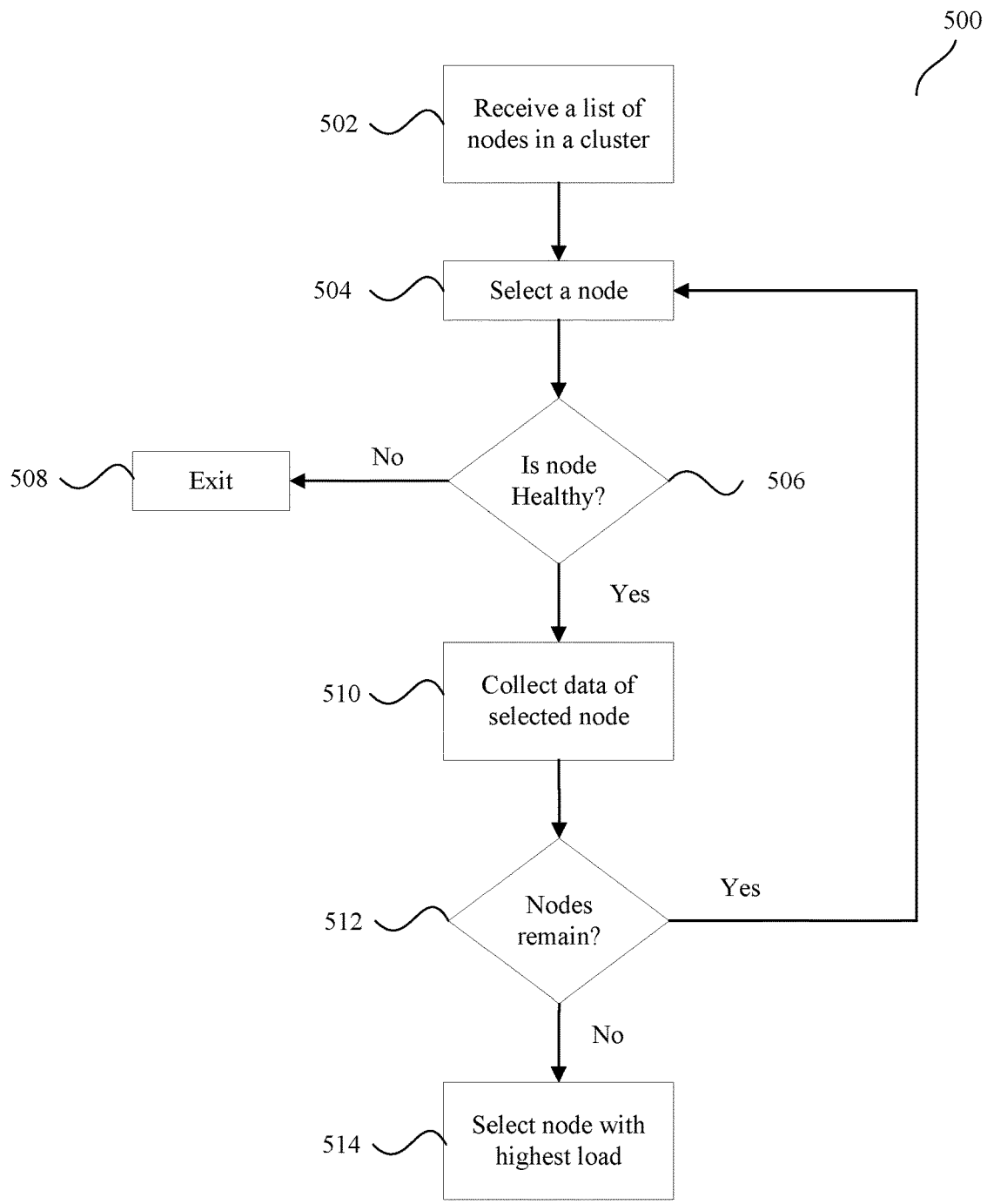
FIG. 5A-5C illustrate flow diagrams of exemplary methods for preventive care of resource workloads according to some embodiments of the present disclosure.
Figure 5B:
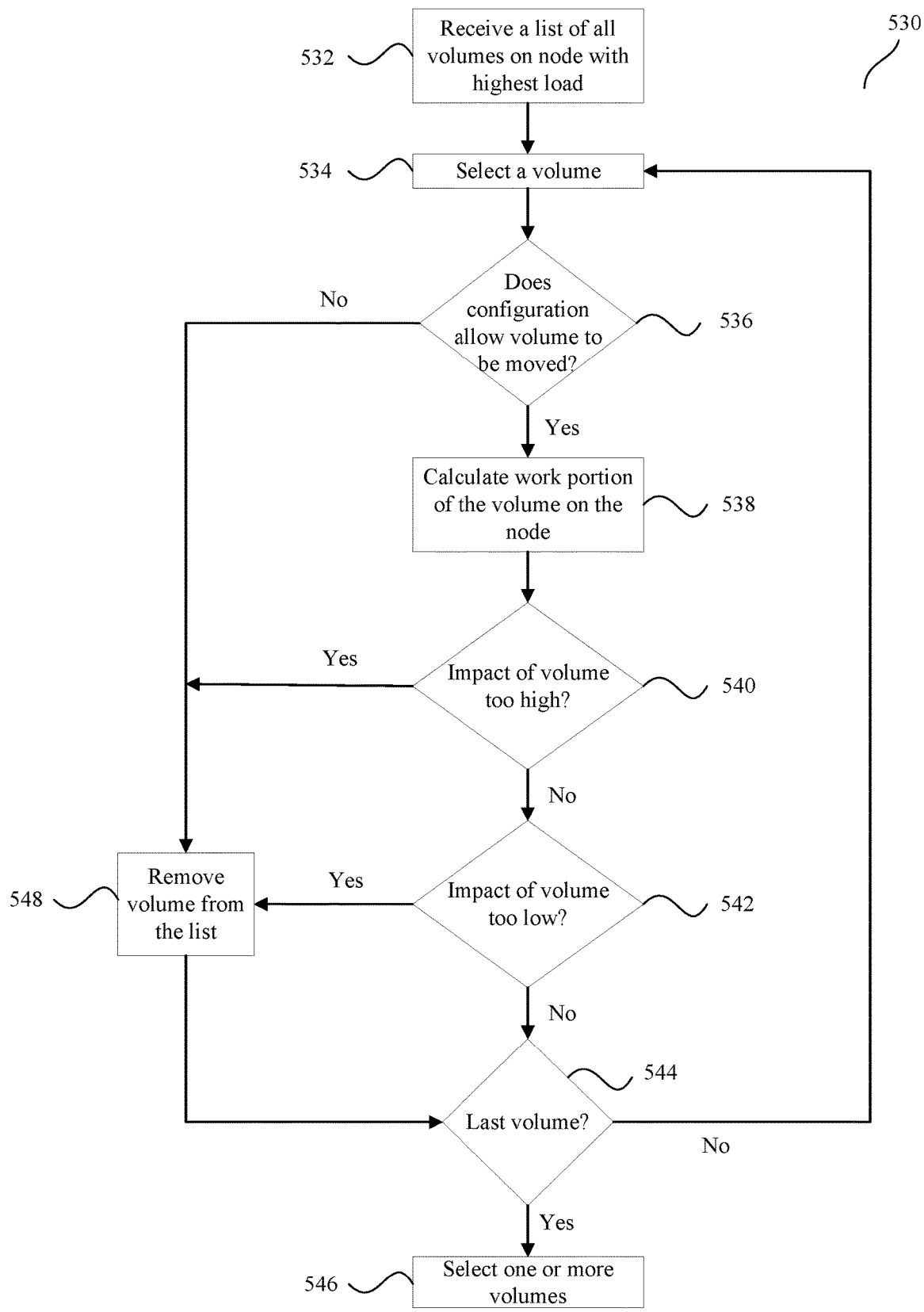
Figure 5C:
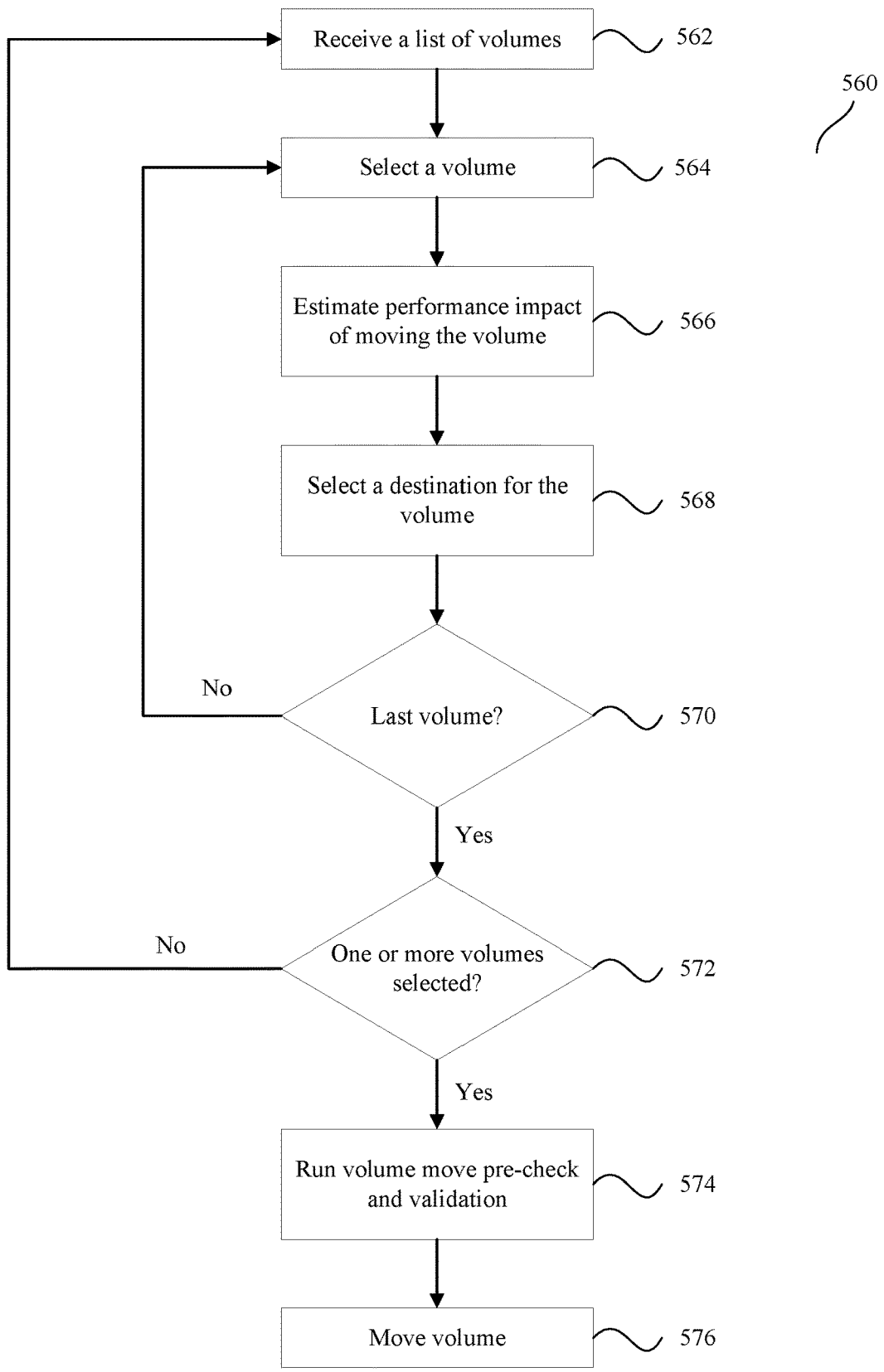

Turning to FIGS. 5A-5C, flow diagrams of exemplary preventive resource management methods 500, 530, and 560, respectively are illustrated according to embodiments of the present disclosure. In some embodiments, preventive resource management methods 500, 530, and 560 may illustrate exemplary aspects of the preventive action 308 in state diagram 300.

In some embodiments, preventive resource management methods 500, 530, and 560 may be used at block 408 of method 400. In some embodiments, methods 500, 530, and 560 may perform a load balance analysis. Operations of methods 500, 530, and/or 560 may occur without taking the storage system offline. That is, the storage system may operate normally while the methods 500, 530, and 560 are being performed with little to no reduction in performance of the storage system. Methods 500, 530, and 560 may be performed by a management module that analyzes resources, or nodes, in a storage system. In some embodiments, the performance manager 121 may perform the aspects related to methods 500, 530, and/or 560.

Looking first at FIG. 5A, a method 500 of analyzing nodes in a cluster is illustrated. The performance manager 121 may analyze nodes in a storage system, such as, for example, a cluster-based storage system such as clustered storage system 202 of FIG. 2, to determine if a load imbalance exists and select the node with the highest load. It is understood that additional steps can be provided before, during, and after the steps of method 500, and that some of the steps described can be replaced or eliminated for other embodiments of the method 500.

At block 502, the performance manager 121 may receive a list of nodes in a cluster to be analyzed. In some embodiments, receiving the list of nodes may refer to the performance manager 121 generating the list. In other embodiments, receiving the list of nodes may refer to the list of nodes being sent to the performance manager 121 from another source, such as the cluster itself and/or a user of the cluster.

At block 504, one of the nodes is selected from the list of nodes. In some embodiments, a node may be selected at random. In some embodiments, a node may be selected in a specified order.

At decision block 506, the performance manager 121 determines whether the selected node is healthy. If the node is not healthy, method 500 proceeds to block 508.

At block 508, the analysis ends and exits. The analysis of method 500 may exit regardless of whether any nodes remain to be analyzed. This may be because, in some embodiments, the performance manager 121 expects all nodes to be healthy before attempting to balance the cluster.

Returning to decision block 506, if, instead, the node is healthy, method 500 proceeds to block 510.

At block 510, the performance manager 121 may collect data of the selected node. The collected data may be aggregated for analysis. In some embodiments, the data collected may be performance samples of the node over a collection time, such as a monitoring period. Thus, for example, this may refer to the same action taken at block 402 of FIG. 4, while in other examples this may refer to an additional action. In some embodiments, the collection time period may be 24 hours. In some embodiments, the data collected may state data of all of the aggregates in the cluster. In such embodiments, aggregates that are not online may be removed from consideration. In some embodiments, the aggregated data may include performance capacity units (PCU), and may be represented by a headroom value. In some embodiments, internal workloads may be excluded from the data collected.

At decision block 512, the performance manager 121 determines whether any other nodes remain to be analyzed in the cluster. This may include, for example, a comparison against the list of nodes received/generated at block 502. If there are remaining nodes, method 500 returns to block 504 to select another node for analysis. If, instead, all nodes have been analyzed, method 500 proceeds to block 514.

At block 514, the performance manager 121 may select the node with the highest load. In some embodiments, to facilitate this the performance manager 121 may first sort the nodes by order of workload. In some embodiments, the nodes are sorted by descending PCU, or alternatively headroom values. In some embodiments, the nodes are sorted by capacity. In some embodiments, the nodes are sorted by descending capacity overflow. The performance manager 121 then selects the node with the highest workload from the sorted list. In some embodiments, the performance manager 121 may select the node causing the most imbalance as a result of selecting from the sorted list.

After the nodes of a cluster are analyzed, and a node selected with the highest load (e.g., causing the most imbalance) as demonstrated in FIG. 5A, the performance manager 121 may then turn to analyzing the workloads in the node with the highest load in order to identify potential volume(s) to move to reduce that imbalance. An example is illustrated in FIG. 5B, which provides a method 530 of analyzing volumes in a node, including to aid in filtering out volumes that are not good candidates for moving in order to support preventive actions according to embodiments of the present disclosure. The performance manager 121 may analyze volumes in a node to select one or more nodes to be moved to reduce the imbalance. In some embodiments, the volumes analyzed may be from the node selected at block 514 of FIG. 5A. It is understood that additional steps can be provided before, during, and after the steps of method 530, and that some of the steps described can be replaced or eliminated for other embodiments of the method 530.

At block 532, the performance manager 121 receives a list of all volumes on a determined to have the highest load in the storage system (e.g., as determined from method 500).

At block 534, a volume is selected from the list of volumes of block 532. In some embodiments, a volume may be selected at random. In other embodiments, a volume may be selected in a specified order (e.g., by the performance manager 121).

At decision block 536, the performance manager 121 determines whether the selected volume can be moved to a different node. In some embodiments, the configuration of the volume may influence whether the volume can be moved. Some examples of such a configuration-based determination include incompatible volume configurations, volumes that have LUNs, metadata volumes, volumes on a fabric pool aggregate that have a tiering policy (e.g., tiered in the cloud), and/or volumes that are root volumes (as just a few examples). If it is determined that the volume can be moved, method 530 proceeds to block 538.

At block 538, the performance manager 121 calculates the work portion of the volume on the node, which may refer to the amount of work each volume causes to be contributed to the node. In some embodiments, the work portion of the volume may be calculated as percentage of the computer processing unit (CPU) utilization by the volume. In some embodiments, the work portion of volume may be calculated based on the storage size of the volume compared to the storage size of the node. A running total of the work portion of each volume on the node may be maintained and the work portion of the selected volume may be added to the running total. In some embodiments, the work portion of the volume may be determined by the size of the amount used of the volume. In some embodiments, the work portion of the volume may be determined by the volume's input/output operations per second (IOPS). In some embodiments, the calculation includes estimates of the future used-size and IOPS of the volume. These values, or some subset thereof, may be used in further aspects of FIG. 5B to perform filtering and determination.

At decision block 540, the performance manager 121 may determine whether the impact of the volume (e.g., based on the work portion of the volume on the node calculated at block 538) is too high relative to the total load of the node, in order to potentially filter the list of volumes. In some embodiments, the determined impact of each volume may be an estimated impact. For example, choosing to move a high impact volume to a different node may lower the total load of the given node to point where a volume needs to be moved to the node. As another example, moving the high impact volume may correct the imbalance at the current node but introduce a new imbalance that requires correction. Such action may cause a ping-pong effect of moving volumes back and forth between nodes, which would degrade, instead of enhance, the performance. The ping-pong effect may be avoided by not moving high impact volumes.

In some embodiments, a volume's impact may be deemed to be too high if the volume accounts for over about 50% of the node's load (as just one numeric example). Alternatively or additionally, a volume's workload may be deemed to be too high if the volume's TOPS account for more than about 50% of the node's TOPS (as just one numeric example). As yet another alternative or additional element, a volume's impact may be deemed to be too high if the volume's throughput, e.g. measured in megabytes per second, accounts for more than about 50% of the node's throughput (as just one numeric example). If it is determined that the impact of the volume is not too high, method 530 proceeds to decision block 542.

At decision block 542, the performance manager 121 may further filter the list of volumes by determining whether the impact of the volume (e.g., based on the work portion of the volume on the node calculated at block 538) is instead too low relative to the total load of the node. This may be useful in order to filter out volumes that would not change the imbalance in a meaningful way (e.g., minimal impact if at all). In some embodiments, the volume's impact may be deemed to be too low if the volume's workload is less than about 1% of the node's total workload (as just one numeric example). In some embodiments, the volume's workload is deemed to be too low if the volume's TOPS are less than about 5% of the nodes TOPS and the volume's throughput is less than about 5% of the node's throughput (as just some numeric examples). If it is determined that the impact of the volume is not too low, method 530 proceeds to decision block 544.

At decision block 544, the performance manager 121 determines whether any more volumes remain to be analyzed. If there are one or more volumes remaining to be analyzed, method 530 returns to block 534 to select another volume to analyze/filter/etc. If, instead, all volumes have been analyzed, method 530 proceeds to block 546.

At block 546, the performance manager 121 selects one or more of the top volumes as candidates to be moved from the node to another node in order to take preventive action. In some embodiments, the performance manager 121 may select a number of volumes (e.g., the top 50 volumes as just one example) as candidates to be moved. In some embodiments, the volume with the lowest TOPS density may be selected first to avoid creating a performance or capacity load imbalance. In some embodiments, the performance manager 121 may select the one or more volumes that have the highest relative load in the node. The selected volume(s) from block 546 may then be used in method 560 to select a volume to actually be moved, as discussed further below with respect to FIG. 5C.

Returning to decision block 536, if it is instead determined that the volume cannot be moved, method 530 proceeds to block 548.

At block 548, the performance manager 121 may remove the selected volume (block 534) from the list of volumes received at block 532. For example, a volume whose configuration does not allow for it to be moved should not be analyzed. As another example, a volume whose impact is too high will cause further load problems by moving the volume to another node. As another example, a volume impact is too low will not positively affect the system imbalance and would require another volume to be moved. The list of volumes is therefore filtered according to method 530. Method 530 may proceed from block 548 to decision block 544 to determine whether there are any other volumes to consider in the list, as discussed above and further below.

Returning to decision block 540, where the performance manager 121 may determine whether the impact of the volume is too high relative to the total load of the node, if it is instead determined that the workload of the volume is too high, method 530 proceeds to block 548 as discussed above.

Returning to decision block 542, where the performance manager 121 may further filter the list of volumes by determining whether the impact of the volume is instead too low relative to the total load of the node, if it is instead determined that the impact of the volume is too low, method 530 proceeds to block 548 as discussed above.

As a result of method 530, the performance manager 121 has a filtered list of volumes that are candidates for being moved from the node at issue to another node. With this filtered list, the performance manager 121 may then utilize the method 560 of FIG. 5C, which illustrates a method of selecting a volume to moved. The performance manager 121 may analyze a list of volumes and select one or more volumes to move to another node, or resource. In some embodiments, the list analyzed may be from the filtered list from FIG. 5B. It is understood that additional steps can be provided before, during, and after the steps of method 560, and that some of the steps described can be replaced or eliminated for other embodiments of the method 560.

At block 562, the performance manager 121 may receive a list of volumes. This may be from the method 530 performed at the performance manager 121 previously, or alternatively may be provided from a node. In some embodiments, a first list of volumes is provided that is a subset of the total number of volumes on the node, such as a result of filtering per FIG. 5B. In such embodiments, a second list is maintained in case the first list of volumes does not produce a viable candidate volume to move.

For example, the method 560 may be repeated through all of the volumes listed in the first list. The method 560 may turn to the second list of volumes for analysis if, after analyzing all of the volumes in the first list of volumes, a suitable volume to move cannot be found. In some embodiments, the list of volumes may be a list of the top volumes selected as candidates to move from one node to another to cure an imbalance in a storage cluster (see, e.g., block 546 of FIG. 5B). In other embodiments, the list of volumes may consist of all of the volumes on the node.

At block 564, the performance manager 121 may select a volume to analyze. In some embodiments, a volume may be selected at random. In some embodiments, a volume may be selected in a specified order, such as the top-ranked volume in the list (e.g., as a result of the volumes being sorted beforehand).

At block 566, the performance manager 121 may estimate the performance impact of moving the volume from its current node to a new node. In some embodiments, the performance impact may be determined based on headroom, such as by using PCU values for the nodes. In some embodiments, the work portion of the volume may be used to estimate the impact of moving the selected volume on the current node to potential target nodes. The performance impact may be measured, for example, by the current and projected used performance capacities of the current node and the new node.

At block 568, the performance manager 121 may select a destination node for the selected volume based on the estimate(s) determined at block 566. The destination node may be selected in order to reduce the imbalance in the storage cluster as the preventive action. In some embodiments, the destination node may be the node with the lowest load that can accept the selected volume. In some embodiments, the performance manager 121 may select a set of aggregates that are compatible with the selected volume.

In some embodiments, any candidate aggregate on the same node as the selected volume may be removed from the set of compatible aggregates. In some embodiments, remaining candidate aggregates may be filtered to remove aggregates that do not meet the selected volume's expected latency. For example, a volume that is on an SSD aggregate would be expected to be moved to a different SSD aggregate as opposed to an HDD aggregate, because an HDD aggregate might not meet the performance requirements of the volume. The performance manager 121 may further consider potential workload effects on the source and destination node in order to avoid a ping-pong effect requiring volumes to be moved repeatedly. Further, aggregates that do not belong to the same type, or tier, of the current source aggregate (where the volume currently resides) may also be filtered out. In yet further embodiments, aggregates may be filtered out based on estimated capacity used.

The potential destination aggregates may then be sorted to determine the destination. In some embodiments, the criteria used for sorting may include sorting by the latency of the aggregate, the projected utilization of the destination node hosting the aggregate, the available size of the aggregate, and/or some combination of the above. In embodiments that are based on the available size of the aggregate, the sorting may favor target destination aggregates with larger available sizes. The performance manager 121 may save the topmost aggregate as the target aggregate of the selected volume.

At decision block 570, the performance manager 121 determines whether any volumes remain to be analyzed. If there are one or more volumes remaining to be analyzed, method 560 returns to block 564 to select another volume to analyze and proceed as discussed above and further below. If, instead, there are no more volumes to be analyzed, method 560 proceeds to decision block 572.

At decision block 572, the performance manager 121 determines whether one or more volumes having a destination aggregate have been selected. In some embodiments, the performance manager 121 may select multiple volumes (e.g., 3) and their destination aggregate as candidates to be moved. If the total number of volumes having targets are not selected, method 560 may return to block 562 to analyze a list of volumes. If, instead, the total number of volumes, and their destination aggregates, are selected, method 560 proceeds to block 574.

At block 574, the performance manager 121 may run a volume move pre-check and/or validation on the selected volume(s). The pre-check may include checking against the operating system, e.g. operating system 107 of FIG. 1, to check if any of the selected volume(s) involve a move to a high-availability node. If so, that volume(s) may be the one selected to be moved. Validation may include checking for any error codes associated with a test move. If any error codes arise, the performance manager 121 may evaluate them. For example, if an error code relates to the loss of cross-volume deduplication savings (if any), that may be considered a non-obstructive error code and may result in validation. As another example, other error codes may be considered as a reason to fail validation. In some embodiments, a volume having a high availability node as the destination may be selected over other volumes.

At block 576, the performance manager 121 moves the selected volume from the source node to the destination aggregate (and corresponding node). In some embodiments, storage operating system 107 may perform the task of moving the selected volume—that is, the performance manager 121 may instruct the operating system 107 to perform the move task based on the analysis and selection performed above.

With the volume moved, a preventive action has been taken. This process may be repeated in an iterative fashion to further improve the load balance between nodes. In some examples, the process may be repeated with respect to a given list already filtered, such that method 560 repeats several times while methods 500 and 530 don't. In other embodiments, the process may be repeated including methods 530 and 56, and in yet further embodiments aspects of methods 500, 530, and 560 may be repeated after each move (and so long as the system remains in the well state 306. Such preventive action may rebalance the load of the resources to avoid unnecessary hot spots and keep the resources working within their optimal performance capacity.

Figure 6:
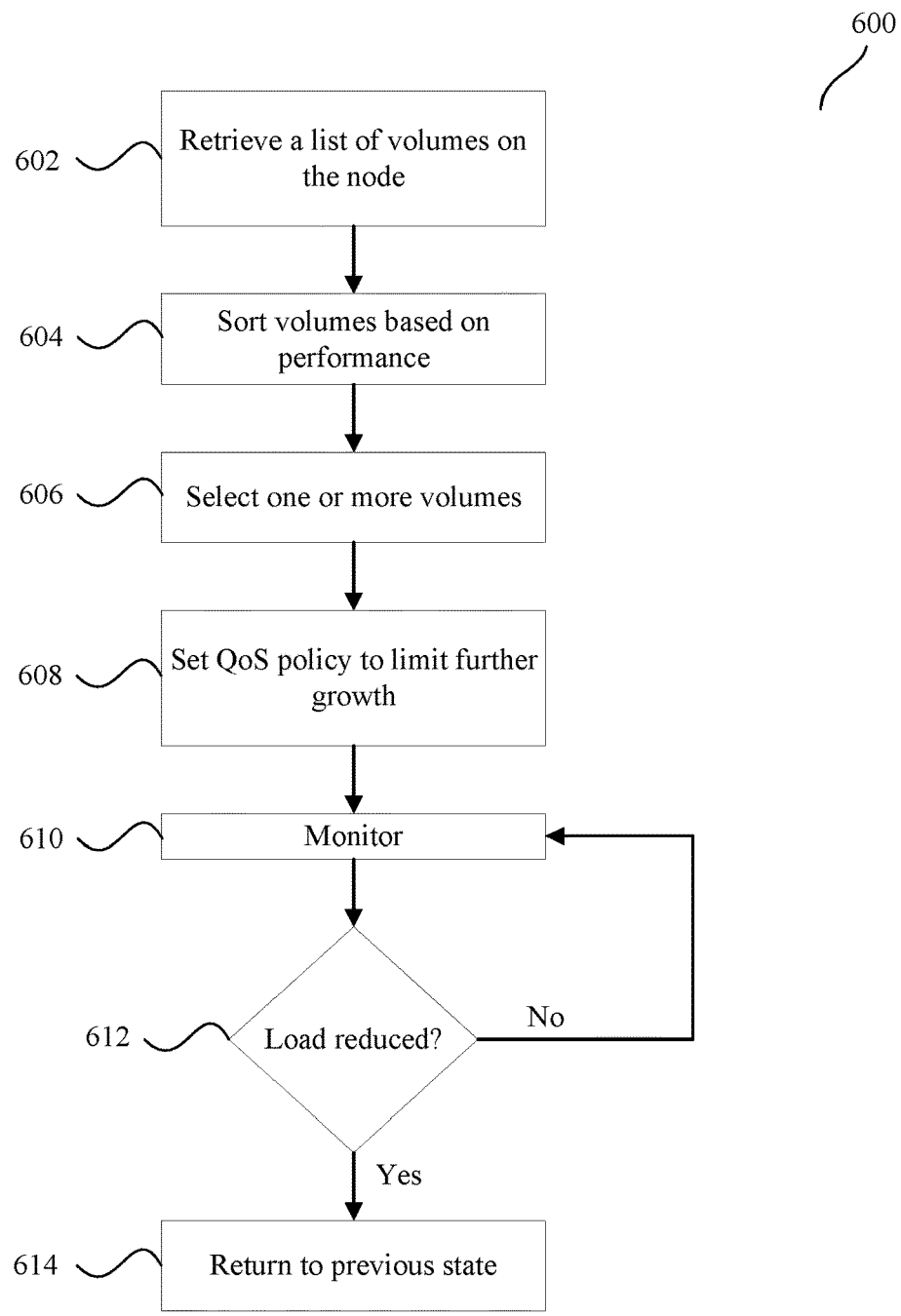
FIG. 6 illustrates a flow diagram of an exemplary method of proactively managing resource workloads according to some embodiments of the present disclosure.

Turning to FIG. 6, a flow diagram of exemplary proactive resource management method 600 is illustrated according to some embodiments of the present disclosure. According to embodiments of the present disclosure, method 600 provides a mechanism for limiting the growth of the demand in a node by introducing QOS limits on workloads. In some embodiments, the method 600 may be initiated after determining that a resource is operating at optimal performance capacity as determined at block 410 of the method 400 in FIG. 4. In other embodiments, method 600 may occur independently of any other actions in other states. In some embodiments, the node may transition to the warning state 312 as described in the state diagram 300. Method 600 may be performed as a background task, or concurrently, with little to no reduction in the normal functions of the storage system.

Method 600 may be performed by a management module that analyzes resource, or nodes, in a storage system. In some embodiments, the performance manager 121 may perform the managements tasks. It is understood that additional steps can be provided before, during, and after the steps of method 600, and that some of the steps described can be replaced or eliminated for other embodiments of the method 600.

At block 602, the performance manager 121 may receive a list of volumes on a node. In some embodiments, the performance manager 121 may specifically receive a list of workloads on a node. The node may be determined based on monitoring the storage system, for example, as explained in block 402 of method 400.

At block 604, the performance manager 121 may sort the list of volumes based on performance. For example, the performance manager may sort based on the PCU consumed by each volume in the node (e.g. the headroom determined by the system).

At block 606, the performance manager 121 may select one or more volumes from the sorted list of volumes of block 604 as candidates on which to impose one or more QOS limits. In some embodiments, the performance manager 121 may select the top number of volumes (e.g., 5) as measured by PCU/headroom, so that the selected volumes may have the highest impact on the performance capacity of the node.

At block 608, the performance manager 121 may sets a QOS policy (i.e., a QOS limit) for each of the selected volumes to limit further growth of the load on the node. Implementing one or more QOS policies reduces demand on the node allowing the node to continue operating at optimal performance capacity. In some embodiments, the performance manager 121 may determine the QOS policy for each of the selected volumes based on historical data of the QOS limits for each volume. In such embodiments, the selected QOS policy may allow the volume to maintain its performance while limiting further growth. In other embodiments, the performance manager 121 may set a similar QOS policy for each volume. In some embodiments, the performance manager 121 may reevaluate the QOS policy after a predefined time period (e.g., every 24 hours as one example) has passed and may modify the QOS policy based on the reevaluated volume conditions. As another example, the performance manager 121 may set multiple QOS policies for any given volume.

At block 610, the performance manager 121 monitors the workload of the node. In some embodiments, the workload of the entire node, or resource, is monitored. In some embodiments, only the selected volumes workload is monitored.

At decision block 612, the performance manager 121 may determine whether the load of the node has been reduced in response to the QOS policy (or policies) set at block 608. If the performance manager 121 determines that the load has not been reduced, method 600 returns to block 610 to continue monitoring the node. In some further embodiments, in addition to monitoring the load based on the implemented QOS limit(s), the performance manager 121 may revisit the QOS limit(s) if, for example, some negative performance threshold is met (e.g., degradation of performance is detected). If, instead, the performance manager 121 determines that the load has been reduced, method 600 proceeds to block 614.

At block 614, the performance manager 121 may return the volume(s) to a prior QOS state. In some embodiments, the performance manager 121 may remove the QOS limit(s) applied to each volume, while in other embodiments the performance manager 121 may revert to a prior QOS limit(s) that may have been more lenient for example. As an example, referring to state diagram 300, the state of the node may change from the warning state 312 to the well state 306 as a result of the use of QOS limit(s) and/or a change in user demand. As another example, the node may remain in the warning state 312 but still be returned to a previously set QOS policy with corresponding QOS limit(s).

Such proactive actions, such as the QOS limits imposed, may assist to ensure continuous, consistent performance of the resource without risking degrading the performance of the resource (which might occur should another action, such as moving a volume, be taken to address the identified issue due to operating at capacity).

Figure 7:
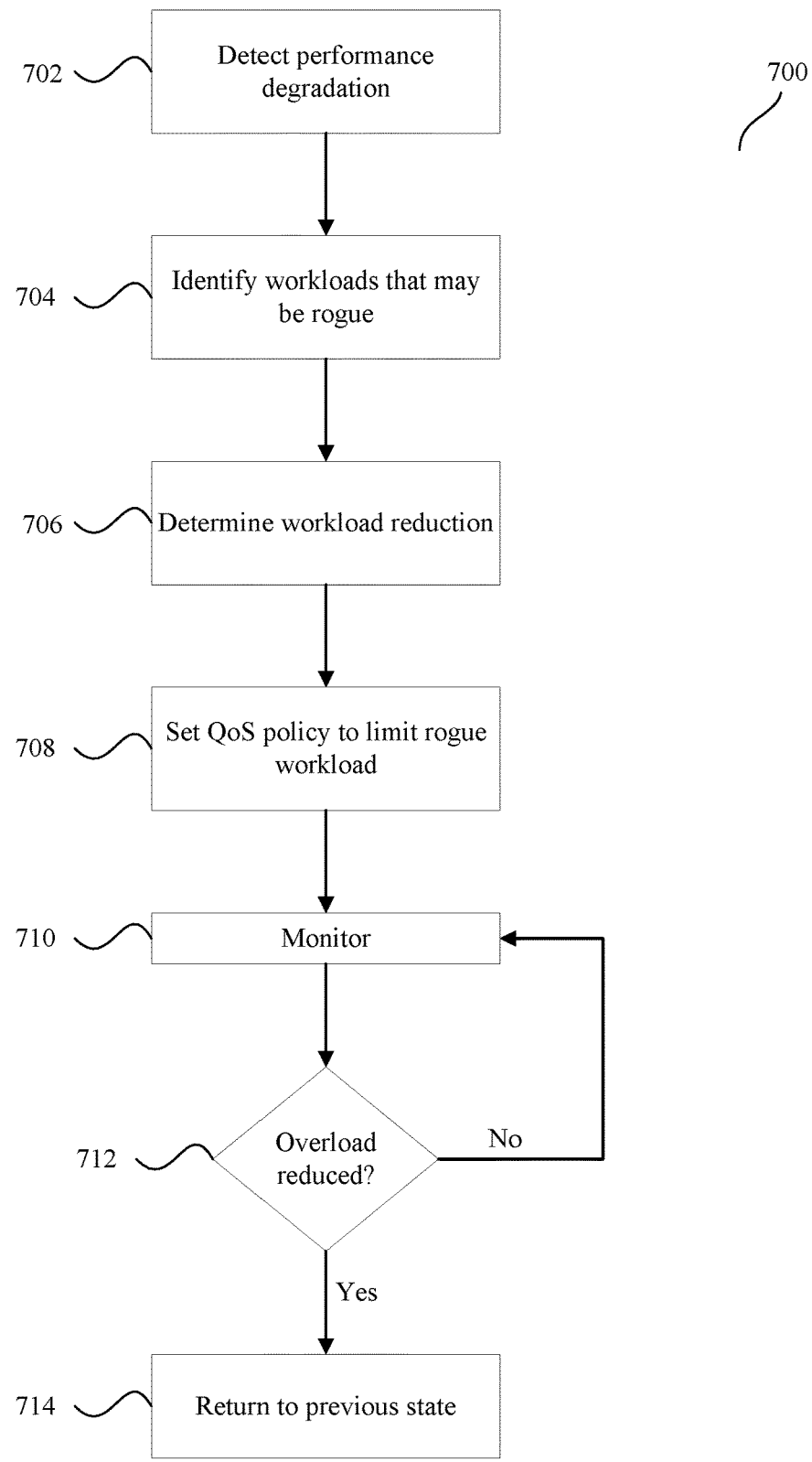
FIG. 7 illustrates a flow diagram of an exemplary method of reactively managing resource workloads according to some embodiments of the present disclosure.

Turning to FIG. 7, a flow diagram of an exemplary reactive resource management method 700 is illustrated according to some embodiments of the present disclosure. Method 700 may provide mechanisms to manage abnormal, or rogue, workload(s) on a volume/node. In some embodiments, the method 700 may be initiated after determining that a resource is operating above optimal capacity as determined at block 414 of the method 400 in FIG. 4. In other embodiments, method 700 may occur independently of any other actions in other states. Method 700 may be performed as a background task, or concurrently, with little to no reduction in the normal functions of the storage system.

Method 700 may be performed by a management module analyzes nodes, or resources, in a storage system to determine whether the node. In some embodiments, the performance manager 121 may perform the management tasks. It is understood that additional steps can be provided before, during, and after the steps of method 700, and that some of the steps described can be replaced or eliminated for other embodiments of the method 700.

At block 702, the performance manager 121 may detect a degradation in performance of a node, or other resource. In some embodiments, a node operating higher than approximately 100% of the node's estimated optimal performance capacity may be considered a degradation in performance. In some embodiments, the degradation in performance is determined by monitoring the storage system as explained in method 400, as an example. In some embodiments, the performance manager 121 may transition the status of a node to the critical state 318 after determining that there is a degradation in performance, as described in state diagram 300 for example.

At block 704, the performance manager 121 may identify workload(s) that may be rogue. A rogue workload may be a process, or volume, that is growing in size or continually (or repeatedly spiking) utilizing all of a node's resources. In some embodiments, the performance manager 121 may use historical performance data to determine that a workload is abnormal. In some embodiments, the measurements of workload may be based on the PCU of the workload, such as the headroom.

At block 706, the performance manager 121 may determine a workload reduction target. This may be an amount of workload reduction (e.g., in PCU/headroom) that would aid the node's performance in returning to at or below 100% of the optimal performance capacity. That is, the target reduction in PCU/headroom may be expressed as a value. In some embodiments, the performance manager 121 may use historical data to make this determination.

At block 708, the performance manager 121 may apply a QOS limit to the rogue workload. In some embodiments, the performance manager 121 may translate the determined value from block 706 (e.g., PCU value) to a QOS limit. The performance manager 121 may then apply the QOS limit to the rogue workload, or volume. Setting a QOS policy on the rogue workload allows other workloads on the node to perform with little to no degradation in performance.

At block 710, the performance manager 121 may monitor the node. In some embodiments, the performance manager 121 specifically monitors the rogue workload, or volume. In some embodiments, monitoring includes taking PCU measurements and making headroom determinations. In some embodiments, the PCU measurements may be stored for future use.

At decision block 712, the performance manager 121 determines whether the overload caused by the abnormal workload has subsided. In some embodiments, the determination may be based on a reduction in PCU (or headroom) of the rogue workload, or volume. In some embodiments, the criteria used to decide may be based on the percentage of resource usage. In such embodiments, the overload may be deemed to have subsided when the resource usage is below 100% of the estimated optimal performance capacity. If the overload has not subsided, method 700 may return to block 710 to continue monitoring. In some further embodiments, in addition to monitoring the status of the overload based on the implemented QOS limit(s), the performance manager 121 may revisit the QOS limit(s) if, for example, some negative performance threshold is met (e.g., further degradation of performance is detected). If, instead, the performance manager 121 determines that the overload has reduced, method 700 proceeds to block 714.

At block 714, the performance manager 121 may return the volume with the previously rogue workload, to its previous QOS state. As an example, the performance manager 121 may remove the QOS limit implemented at block 708 in favor of a QOS limit that was previously in place. In other examples, the performance manager 121 may revert to a prior QOS limit(s) that may have been more lenient. As an example, referring to state diagram 300, the state of the node may change from the critical state 318 to the warning state 312 (when above a threshold value but below 100%) or well state 306 (when below the threshold value) as a result of the use of QOS limit(s) and/or a change in user demand.

Such reactive actions may utilize QOS limits on the abnormally growing workload to bring the overall performance back to within the optimal performance capacity without risking further degrading the performance of the resource (which, again, might occur should another action, such as moving a volume, be taken to address the identified issue due to operating at capacity).

The terms "component," "module," "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

analyzing, by a performance manager executed by a processor, a load imposed by one or more workloads operating on each node in a plurality of nodes;

selecting, by the performance manager based on the analyzing the plurality of nodes, a first node from the plurality of nodes having a highest load of the plurality of nodes;

in response to selecting the first node, analyzing by the performance manager a work portion of each volume of a plurality of volumes hosted on the first node;

selecting, by the performance manager based on the analyzing the plurality of volumes, a first volume from the plurality of volumes for movement to a second node based on the work portion of the first volume being greater than corresponding work portions of a remainder of the plurality of volumes on the first node;

moving, by the performance manager in response to the highest load corresponding to the first node being less than an estimated optimal performance capacity of the first node and before latency for the first node increases more than a utilization increase of a resource of the first node, the first volume from the plurality of volumes to the second node that has a lower load than the highest load corresponding to the first node, wherein the estimated optimal performance capacity comprises a point that represents a maximum utilization of the resource of the first node and wherein beyond the estimated optimal performance capacity of the first node, an increase in the load on the first node causes a larger increase in latency than the utilization increase of the resource;

imposing, by the performance manager in response to the highest load corresponding to the first node being equal to the estimated optimal performance capacity, a first Quality of Service (QoS) limit on at least one workload from the one or more workloads operating on the first node; and imposing, by the performance manager in response to the highest load corresponding to the first node being above the estimated optimal performance capacity, a second QoS limit on the at least one workload that comprises a rogue workload that includes an abnormal performance metric relative to historical performance data.

2. The method of claim 1, further comprising:
after moving the first volume, continuing to analyze the load of each node and move one or more volumes from one or more nodes of the plurality of nodes until the plurality of nodes achieves a desired performance level.

3. The method of claim 1, further comprising:
filtering a volume of the plurality of volumes having a work portion above a threshold from being considered to be selected to be moved as part of the analyzing the work portion of each volume of the plurality of volumes hosted on the first node.

4. The method of claim 1, further comprising:
after selecting the first volume, estimating a performance impact on the first node resulting from moving the first volume to the second node.

5. The method of claim 1, further comprising:
causing the move of the first volume to occur concurrently with processing a regular load of each node.

6. The method of claim 1, wherein the first QoS limit is based on historical workload data of the one or more workloads relative to a current measured value of the one or more workloads.

7. The method of claim 1, further comprising:
determining to select the first volume based on a difference in observed load between the first node and the second node being greater than a threshold.

8. A non-transitory machine readable medium having stored thereon instructions for performing a method of load balancing, comprising machine executable code which when executed by at least one machine, causes the at least one machine to:
select a first node from a plurality of nodes having a highest load of the plurality of nodes;
analyze a work portion of each volume of a plurality of volumes hosted on the first node to identify a first volume from the plurality of volumes having a first work portion that is greater than corresponding work portions of a remainder of the plurality of volumes on the first node;
in response to the highest load corresponding to the first node being less than an estimated optimal performance capacity of the first node, perform a preventive action that includes moving the first volume identified from the analysis to a second node that has a lower load than the highest load associated with the first node, wherein beyond the estimated optimal performance capacity of the first node, an increase in the highest load corresponding to the first node causes a larger increase in latency for the first node than a utilization increase of a resource of the first node;
in response to the highest load corresponding to the first node being equal to the estimated optimal performance capacity of the first node, perform a proactive action that includes imposing a first Quality of Service (QoS) limit on one or more workloads operating on the first node; and
in response to the highest load corresponding to the first node being greater than the estimated optimal performance capacity of the first node, perform a reactive action that includes imposing a second QoS limit on a rogue workload operating on the first node, the rogue workload comprising an abnormal performance characteristic relative to historical performance data.

9. The non-transitory machine readable medium of claim 8, further comprising machine executable code that causes the at least one machine to:
estimate a performance impact on at least one of the first node and the second node resulting from moving the first volume to the second node.

10. The non-transitory machine readable medium of claim 8, further comprising machine executable code that causes the at least one machine to:
repeat, after performing the preventive action, the proactive action, or the reactive action, the analysis of each node from the plurality of nodes.

11. The non-transitory machine readable medium of claim 8, further comprising machine executable code that causes the at least one machine to:
filter, from the plurality of volumes as part of the analysis of the work portion of each volume of the plurality of volumes hosted on the first node, a volume having a work portion below a threshold.

12. The non-transitory machine readable medium of claim 8, further comprising machine executable code that causes the at least one machine to:
change, in response to the reactive action causing the highest load corresponding to the first node reducing to being equal to the estimated optimal performance capacity of the first node, from the second QoS limit to the first QoS limit.

13. The non-transitory machine readable medium of claim 8, wherein the first QoS limit comprises a plurality of QoS limits corresponding to the one or more workloads operating on the first node.

14. The non-transitory machine readable medium of claim 8, further comprising machine executable code that causes the at least one machine to:
determine, as part of the analysis of the work portion of each volume of the plurality of volumes hosted on the first node, that the second node has a compatible configuration for the first volume.

15. A computing device comprising:
a memory containing machine readable medium comprising machine executable code having stored thereon instructions for performing a method of load balancing in a storage system; and
a processor coupled to the memory, the processor configured to execute the machine executable code to cause the processor to:
analyze a work portion of each volume of a plurality of volumes hosted on a first node having a highest load of a plurality of nodes to identify a first volume from the plurality of volumes having a first work portion that is greater than corresponding work portions of a remainder of the plurality of volumes on the first node;
move, in response to the highest load corresponding to the first node being less than an estimated optimal performance capacity of the first node, the first volume from the plurality of volumes to a second node from among the plurality of nodes that has a lower load than the highest load corresponding to the first node, wherein beyond the estimated optimal performance capacity of the first node, an increase in the highest load corresponding to the first node causes a larger increase in latency for the first node than a utilization increase of a resource of the first node;
impose, in response to the highest load corresponding to the first node being equal to the estimated optimal performance capacity of the first node, a first Quality of Service (QoS) limit on one or more workloads operating on the first node; and impose, in response to the highest load corresponding to the first node being greater than the estimated optimal performance capacity of the first node, a second QoS limit on a rogue workload operating on the first node, the rogue workload comprising an abnormal performance characteristic relative to historical performance data.

16. The computing device of claim 15, wherein the processor is further configured to:
   estimate, for the first volume, a performance impact on the second node resulting from moving the first volume to the second node.

17. The computing device of claim 15, wherein the processor is further configured to:
   filter, from the plurality of volumes as part of the analyzing the work portion of each volume of the plurality of volumes hosted on the first node, a volume having a characteristic that would be incompatible with the second node.

18. The computing device of claim 15, wherein the processor is further configured to:
   after moving the first volume, move one or more additional volumes from the plurality of volumes from the first node until the plurality of nodes achieves a desired performance level.

19. The computing device of claim 15, wherein the processor is further configured to:
   determine to identify the first volume based on a difference in observed load between the first node and the second node being greater than a threshold.

* * * * *